United States Patent [19]

Shimizu

[11] Patent Number: 4,835,618
[45] Date of Patent: May 30, 1989

[54] IMAGE FORMING SYSTEM

[75] Inventor: Katsuichi Shimizu, Tokyo, Japan

[73] Assignee: Canon Kabushiki Kaisha, Tokyo, Japan

[21] Appl. No.: 942,035

[22] Filed: Dec. 15, 1986

Related U.S. Application Data

[63] Continuation of Ser. No. 876,659, Jun. 18, 1986, abandoned, which is a continuation of Ser. No. 537,424, Sep. 29, 1983, abandoned.

[30] Foreign Application Priority Data

| Oct. 4, 1982 | [JP] | Japan | 57-174206 |
| Oct. 4, 1982 | [JP] | Japan | 57-174207 |
| Oct. 4, 1982 | [JP] | Japan | 57-174208 |
| Oct. 4, 1982 | [JP] | Japan | 57-174209 |
| Oct. 4, 1982 | [JP] | Japan | 57-174210 |
| Oct. 8, 1982 | [JP] | Japan | 57-178112 |

[51] Int. Cl.$^4$ .................................. H04M 1/04
[52] U.S. Cl. ..................... 358/287; 358/293; 358/285
[58] Field of Search ............. 358/260, 257, 256, 280, 358/282, 287, 293

[56] References Cited

U.S. PATENT DOCUMENTS

| 3,541,245 | 11/1970 | Wilby | 358/287 |
| 4,080,634 | 3/1978 | Schreiber | 358/287 |
| 4,153,916 | 5/1979 | Miwa et al. | 358/257 |
| 4,233,636 | 11/1980 | Harbaugh et al. | 358/287 |
| 4,303,948 | 12/1981 | Arai et al. | 358/287 |
| 4,319,283 | 3/1982 | Ozawa et al. | 358/286 |
| 4,338,636 | 7/1982 | Yamada et al. | 358/256 |
| 4,366,508 | 12/1982 | Crean et al. | 358/287 |
| 4,386,373 | 5/1983 | Kondo et al. | 358/261 |
| 4,417,805 | 11/1983 | Kishi | 358/287 |
| 4,470,074 | 9/1984 | Yamada | 358/287 |
| 4,580,171 | 4/1986 | Arimoto | 358/287 |

FOREIGN PATENT DOCUMENTS 2057222 3/1981 United Kingdom ............... 358/256

Primary Examiner—Edward L. Coles, Sr.
Attorney, Agent, or Firm—Fitzpatrick, Cella, Harper & Scinto

[57] ABSTRACT

The present invention is directed to an image forming system comprising device for producing an image signal by scanning an original image, memory for storing the image signal, unit for receiving the image signal and reproducing an image on a material, and select for selecting a read address of the memory in a main scan direction and selecting a feed timing of the material in a sub-scan direction to form the image while shifting the original image to a desired position on the material.

46 Claims, 44 Drawing Sheets

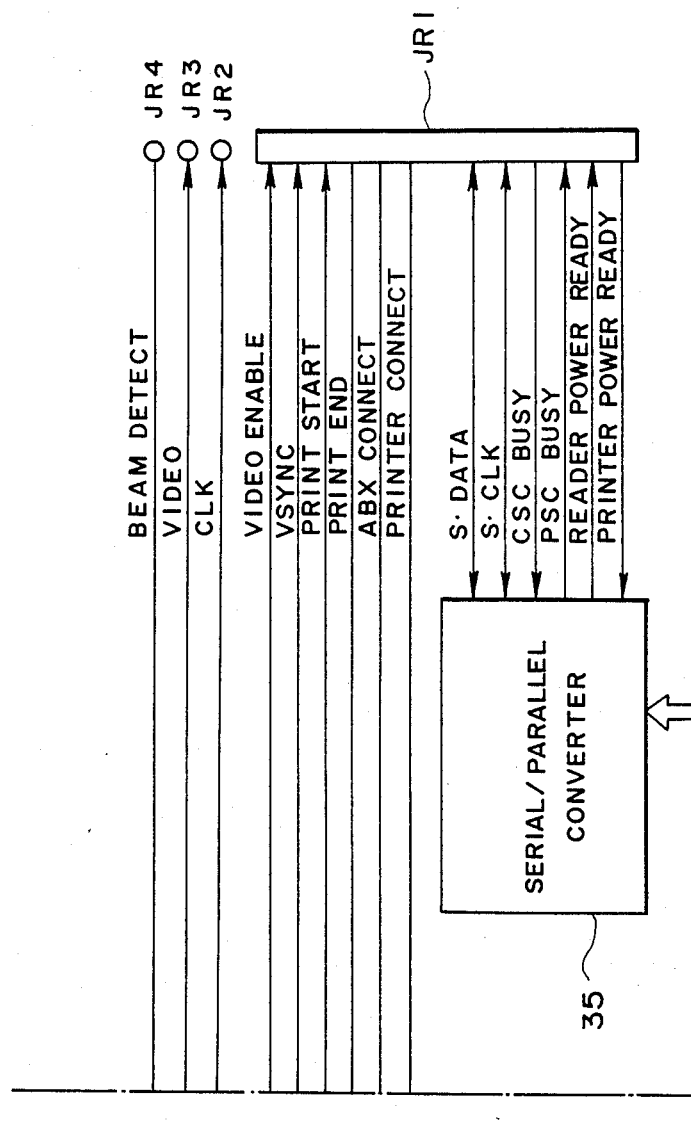

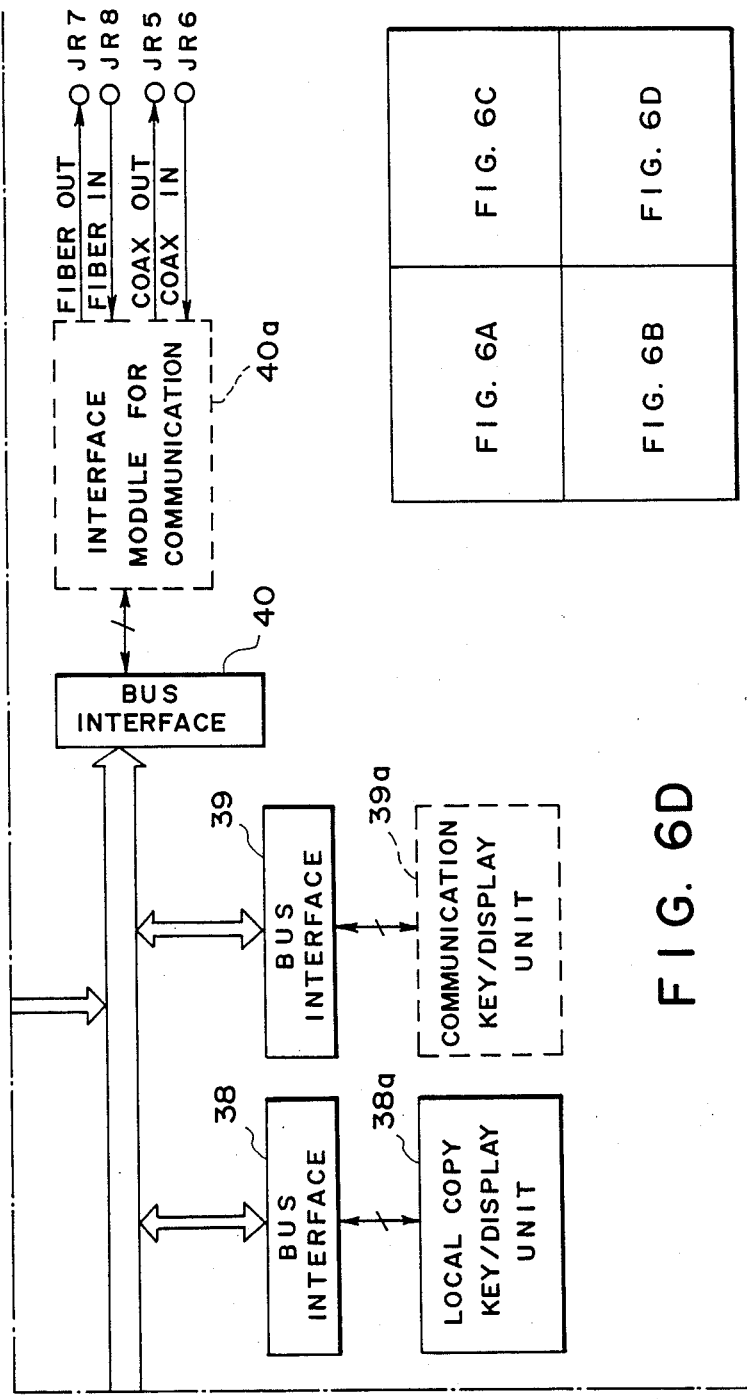

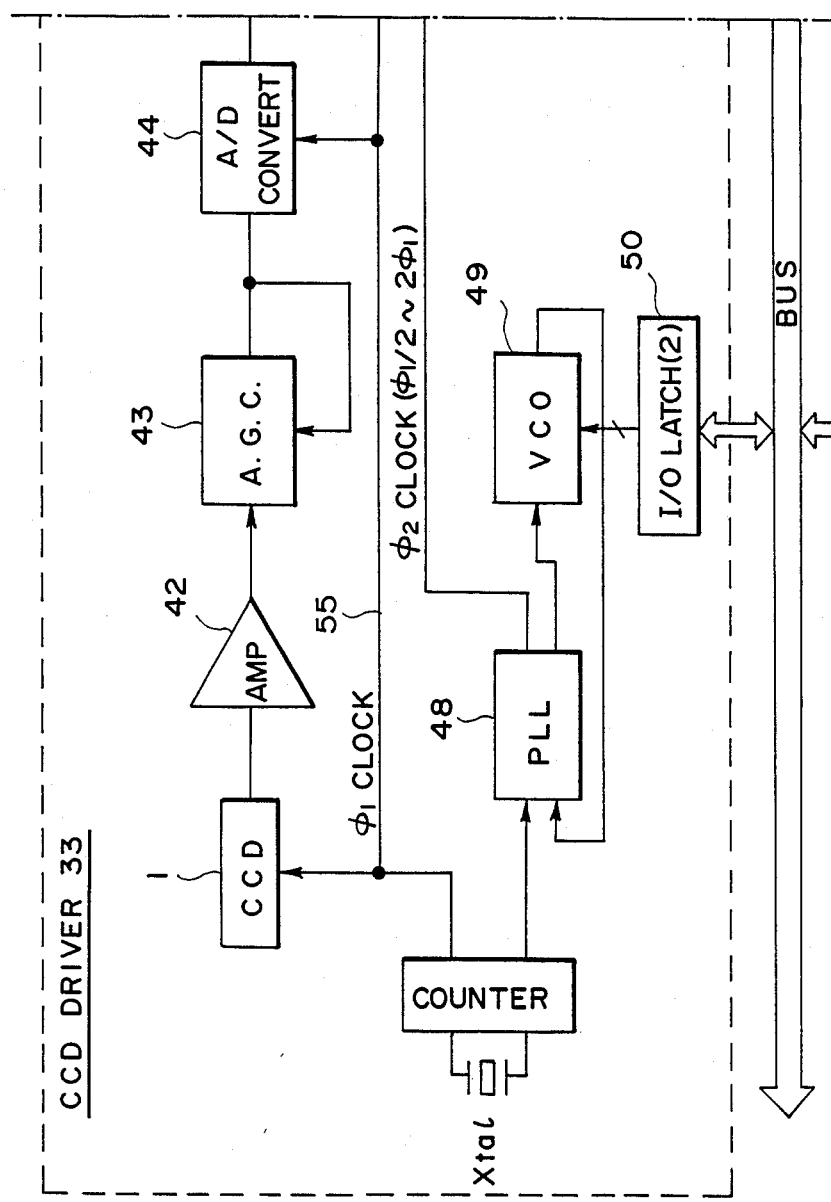

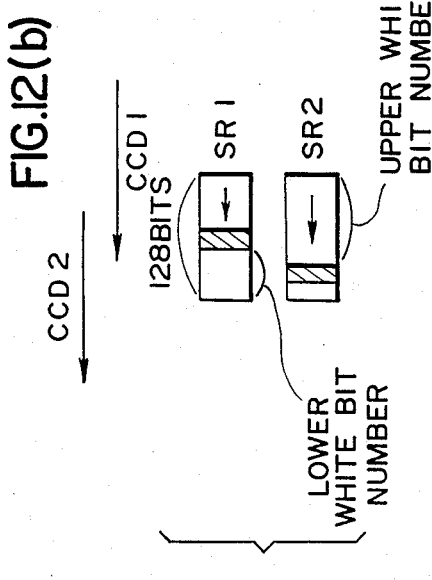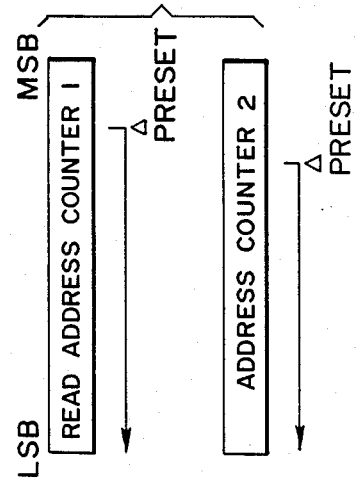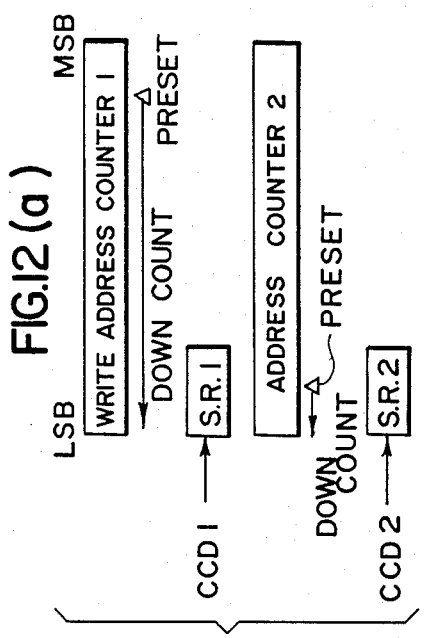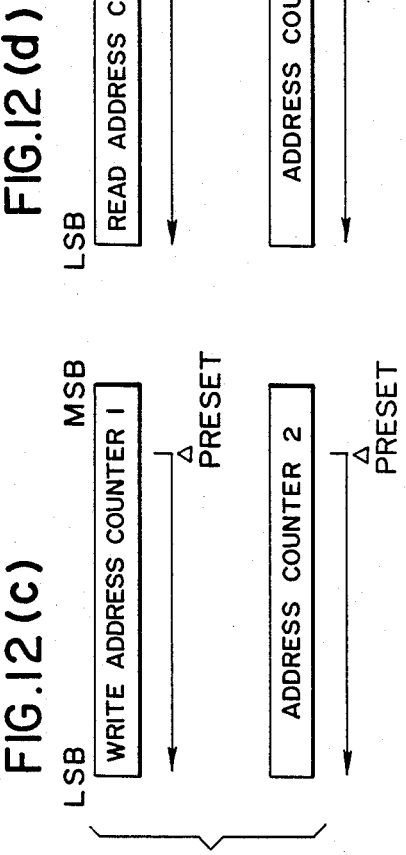

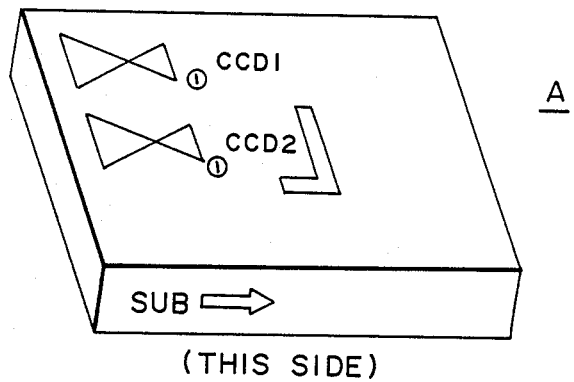
F I G. 14A
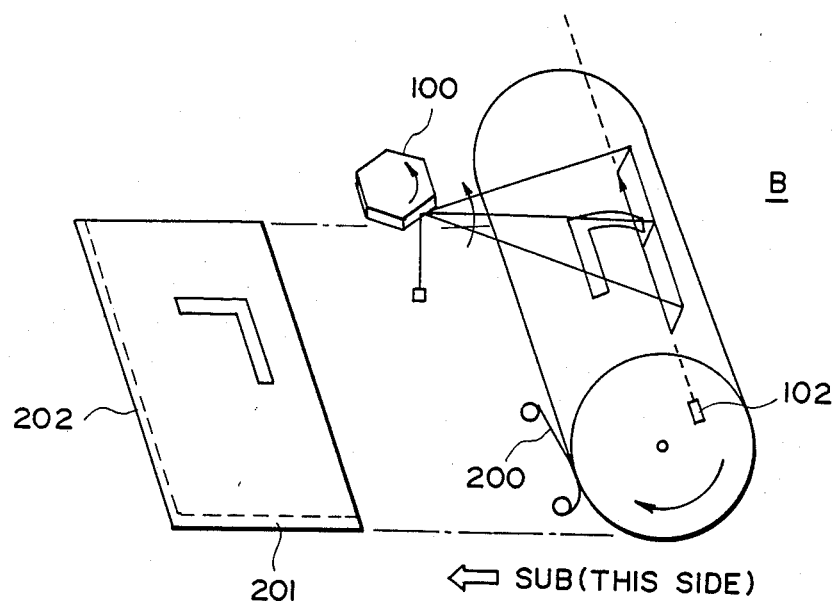
F I G. 14B

| | START BIT COUNTER | END BIT COUNTER |
|---|---|---|
| INITIALIZATION | PRESET 4751 BITS | PRESET 4751 BITS |
| AFTER COUNTING OF $N_0$ LINE | PRESET $H_0$ BITS | PRESET $H_1$ BITS |
| AFTER COUNTING OF $N_1$ LINE | PRESET $H_2$ BITS | PRESET $H_3$ BITS |
| AFTER COUNTING OF $N_2$ LINE | PRESET $H_4$ BITS | PRESET $H_5$ BITS |
| AFTER COUNTING OF $N_3$ LINE | PRESET 4751 BITS | PRESET 4751 BITS |

2-3) PAPER FEED UNIT STATUS

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 1 |   |   |   |   |   |   |   |   | 1 | 1 | 1 | 1 |   | P | 1 |

- 1: CASSETTE OK
- 2: PAPER OK
- 3: AUTO, SWITCHABLE
- 4–8: PAPER SIZE
- E: COMMAND NORMAL 2-4) SORTER STACKER UNIT STATUS

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 1 |   |   |   |   |   |   |   |   | 1 | 1 | 1 | 1 |   | P | 1 |

- 0: SORTER NO JAM
- 1: SORTER CONNECT
- 2: POWER READY
- 3: BIN HITCH (0)
- 4: BIN EMPTY (0)
- 5–8: JAM NUMBER OF SHEETS
- E: COMMAND NORMAL 2-5) READER UNIT STATUS

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 1 |   |   |   |   |   |   |   |   |   |   |   |   |   |   | 1 |

- 1: PRINT ENABLE
- 1: READY

FIG. 20B-2

IMAGE FORMING SYSTEM

This application is a continuation of application Ser. No. 876,659 filed June 18, 1986, now abandoned, which is a continuation of Ser. No. 537,424 filed Sept. 29, 1983, now abandoned.

BACKGROUND OF THE INVENTION

1. Field of the Invention

The present invention relates to an image forming system.

2. Description of the Prior Art

In the past, a role of a copying machine is to reproduce an original with a high fidelity and reduce or magnify the original at fixed magnification scales.

Principally, the copying machine illuminates the original by a light source such as a fluorescent lamp or a tungsten lamp and projects a light reflected from the original surface, that is, an original image to a precharged photosensitive member through a lens and a mirror to form an electrostatic latent image thereon, and apply developing material to the photosensitive member to form a visual image. A process of image forming is mechanically controlled and the magnification/reduction of the original image is attained by changing a position of the lens and changing a relative speed of the original scan. Since the ranges of the movement of the lens and the change of the scan speed are physically limited, there is a limit in the functions attainable by the copying machine which uses the conventional principle of operation. It is difficult to horizontally and vertically move the position of the original image formed on a copy paper, and the range of movement is limited.

A copying machine which stores the original image in a memory and then reads out the image data from the memory to print the image has been proposed. However, it requires a very long time from the start of scan of the original image to the completion of printout and it is unsatisfactory as a high speed copying machine.

SUMMARY OF THE INVENTION

It is an object of the present invention to provide an image forming system which eliminates the above drawbacks.

It is another object of the present invention to provide an image forming system which reads an original image, converts it to an electrical signal, processes the signal and prints out the image in a short time period.

It is another object of the present invention to provide an image forming system which trims a desired area of an original image and prints out a copy at a desired area of a copy paper at a desired magnification scale.

It is another object of the present invention to provide an image forming system which positions a print area on a copy paper by controlling an image data and by mechanical control, in both vertical and horizontal directions.

It is another object of the present invention to provide an image forming system in which a reader for scanning an original image and an image printer operate exactly to each other.

It is another object of the present invention to provide a video interface system which can print out an original image by an image printer having a different print speed than a read speed of an original image reader.

It is another object of the present invention to provide a video interface system which can transmit an image data and associated information at a high speed between an image signal generator and an image printer.

It is another object of the present invention to provide a real-time, digital copying machine which can print out an image while scanning an original, without having a memory capacity corresponding to an original image.

It is another object of the present invention to provide an image data processing system suitable to process an image signal having a half-tone image with a variable magnification scale.

It is another object of the present invention to provide an image data processing system capable of accessing an image memory with a high precision.

Those and other objects of the present invention will be apparent from the following description of the invention.

BRIEF DESCRIPTION OF THE DRAWINGS

FIGS. 14A and 14B illustrate main and sub-scans.

DETAILED DESCRIPTION OF THE PREFERRED EMBODIMENTS

Figure 20A:
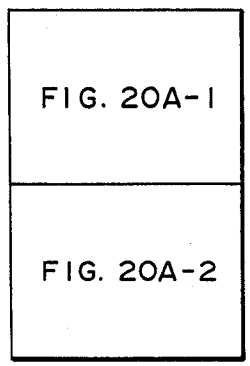
Figure 20B:
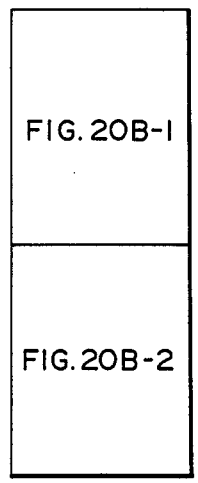
Figures 1, 20A:
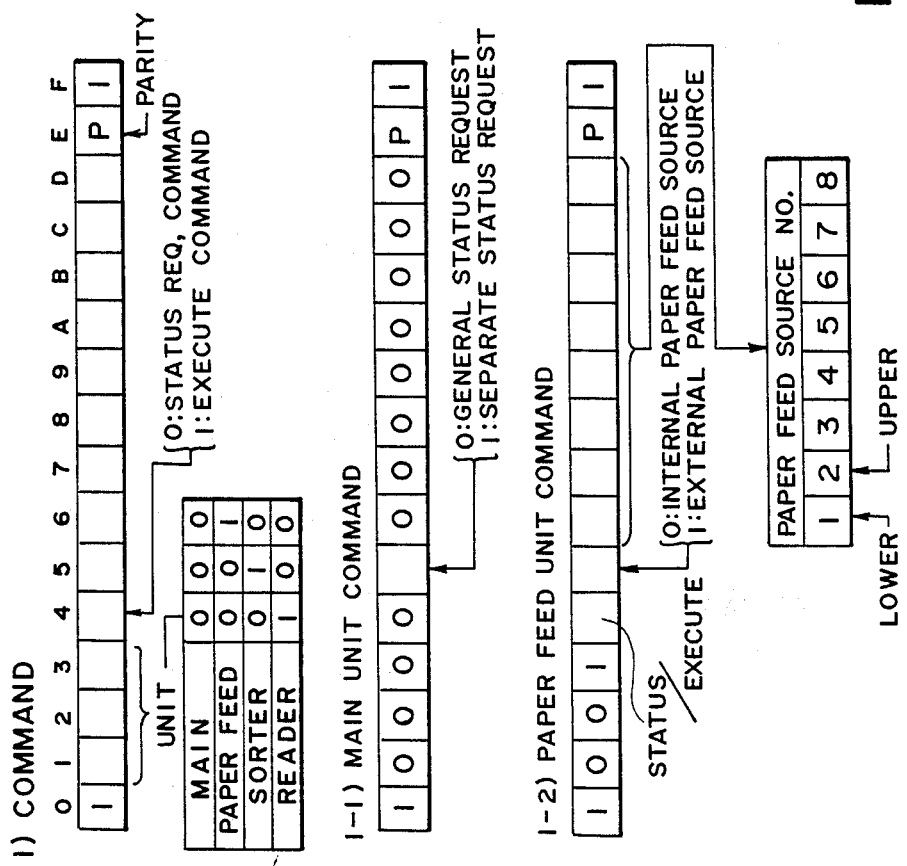
Figures 2, 20A:
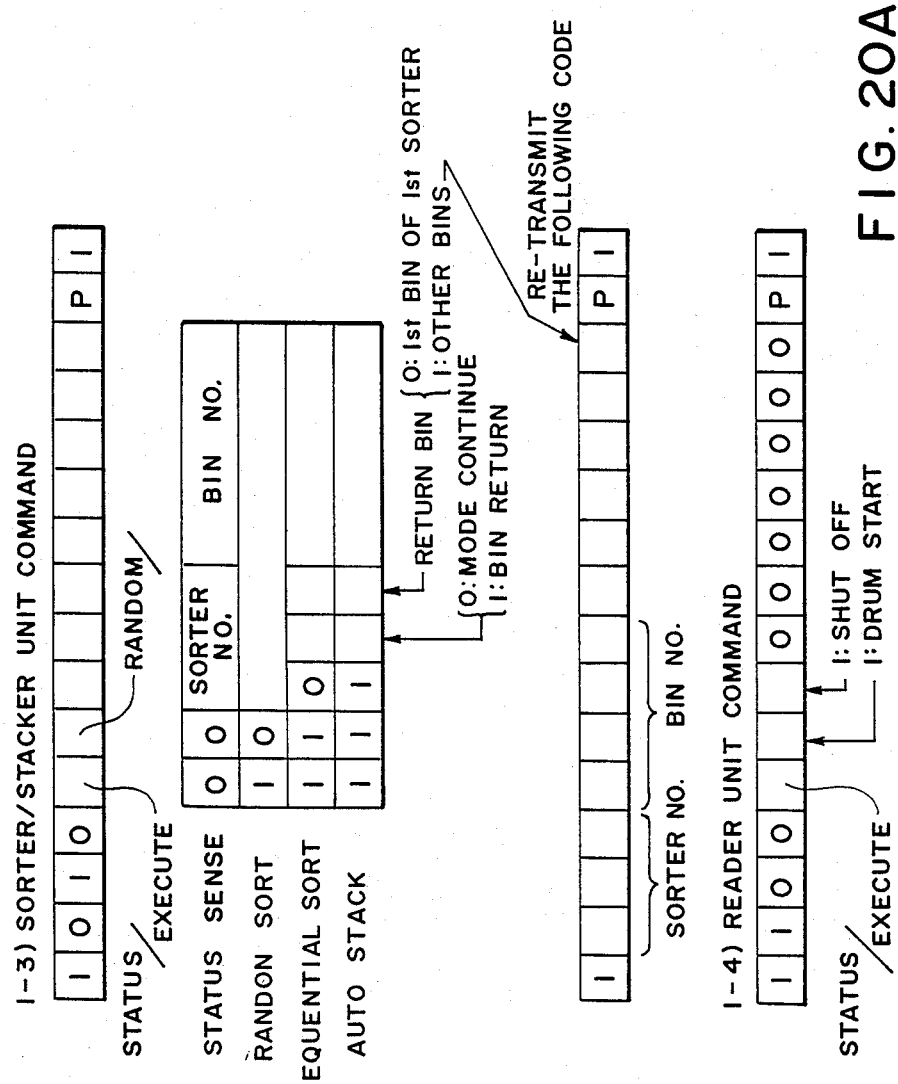
Figure 20B:
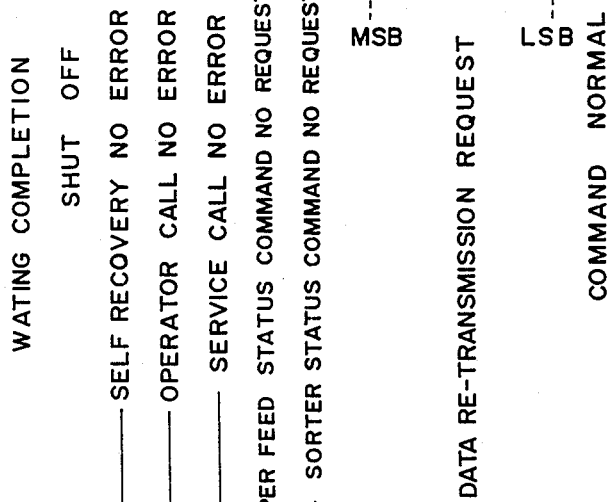
Figure 1:
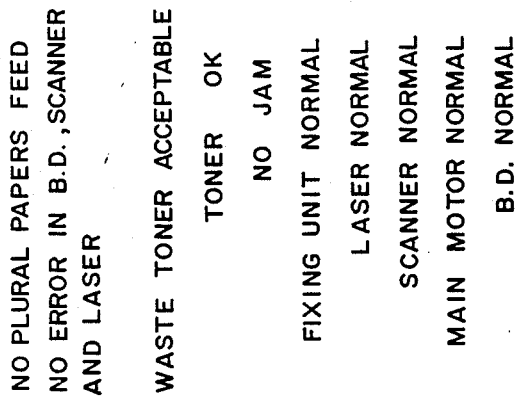
Figure 21A:
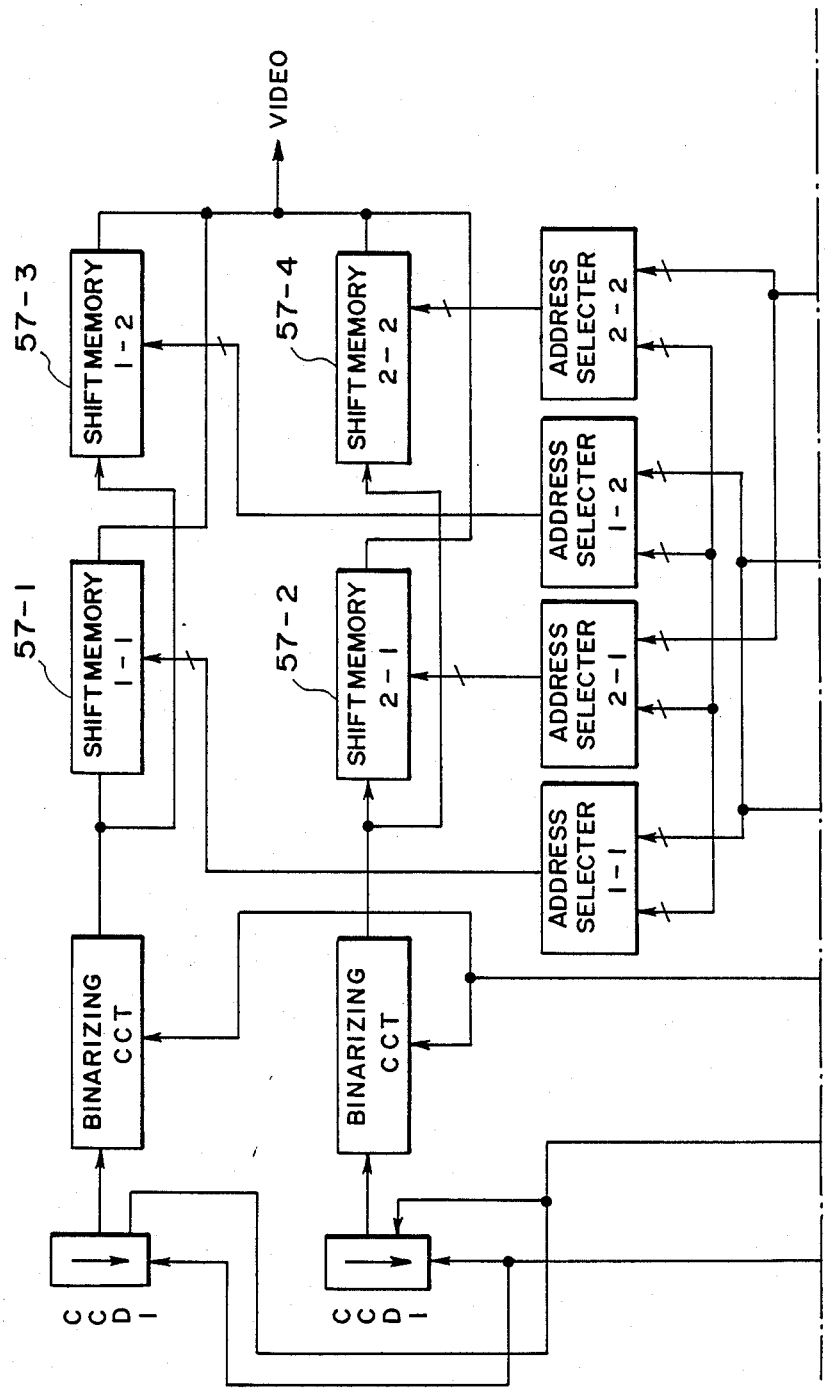
Figure 21B:
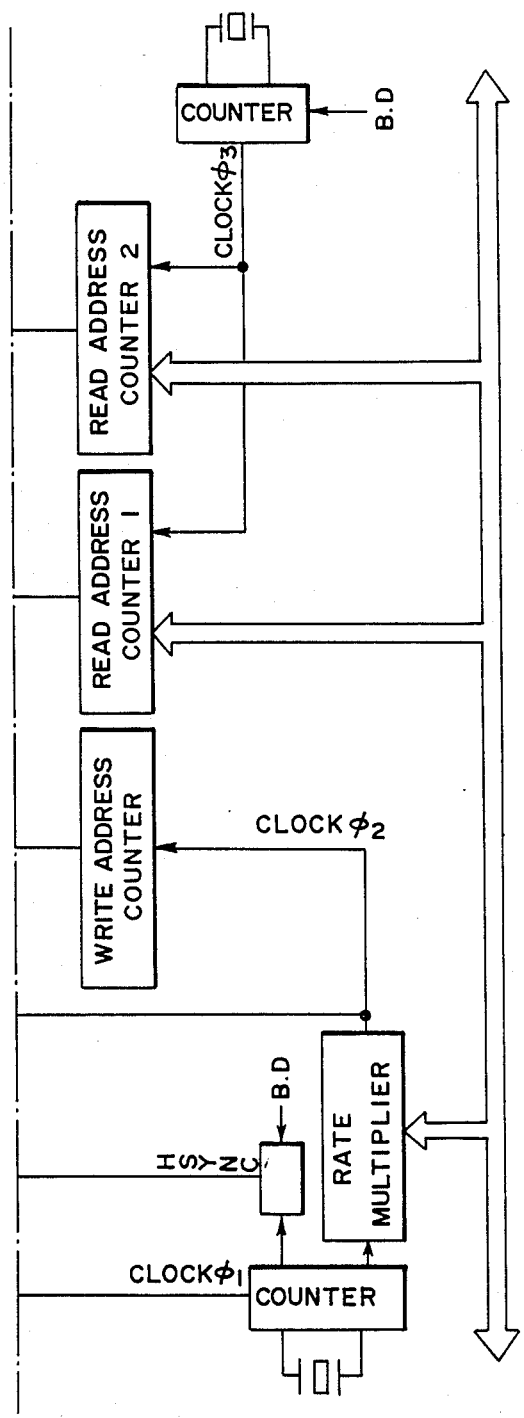

FIG. 1-A shows an external view of a copying machine in accordance with the present invention. The present apparatus basically comprises two units, a reader A and a printer B. The reader and the printer are mechanically and functionally separated so that they can be used singly. They are connected to each other through only an electrical cable. The reader A has a control panel A-1 (FIG. 4) which will be described later.

Figure 2:
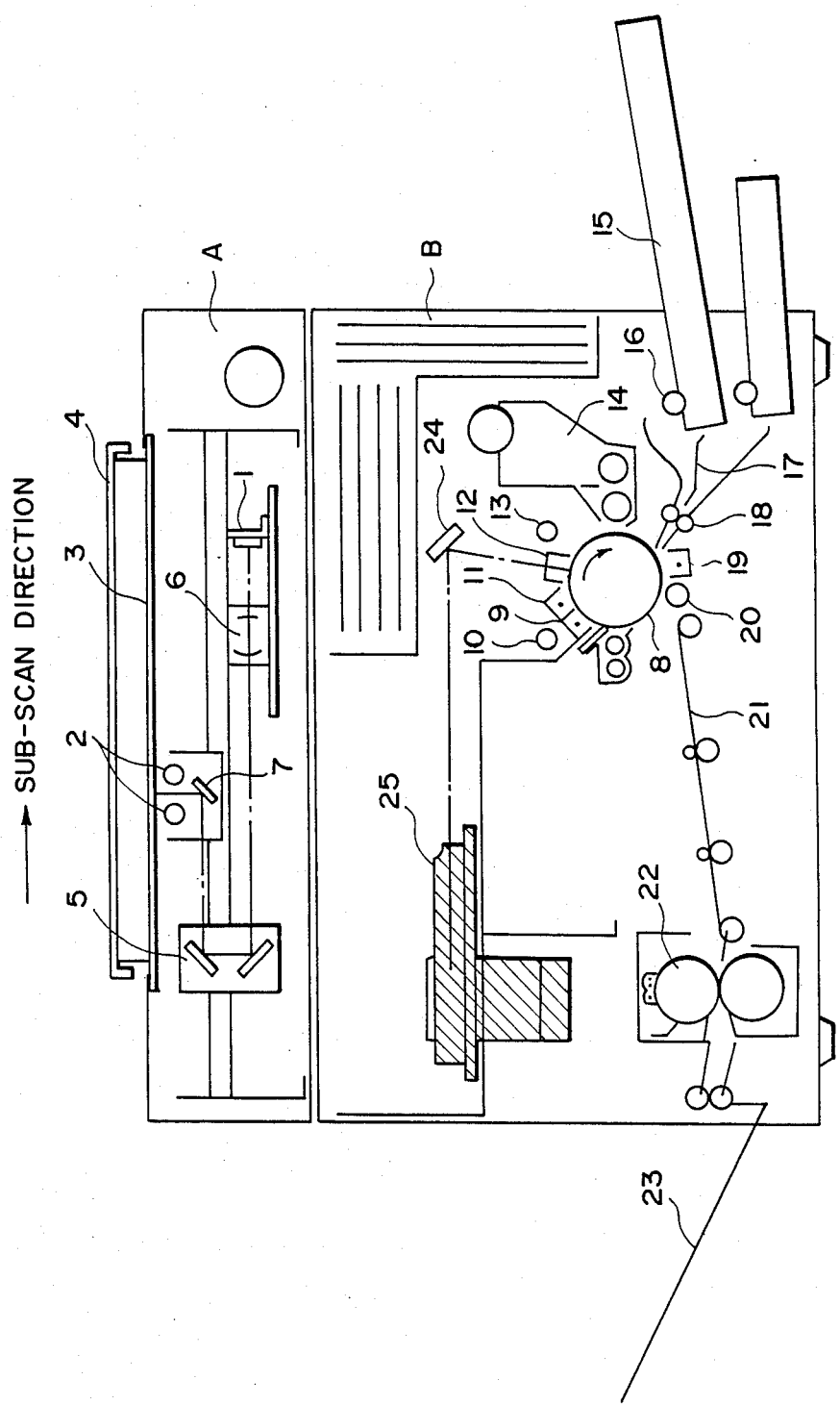
FIG. 2 is a sectional view of the apparatus of FIG. 1A.

FIG. 2 shows a sectional view of the reader A and the printer B. An original is placed in a face-down orientation on an original mount glass 3. A reference position of mounting is on a left inner side as viewed from the front. The original is pressed to the mount glass 3 by an original cover 4. The original is illuminated by a fluorescent lamp 2 and a reflected light therefrom is focused onto a CCD-1 through mirrors 5 and 7 and a lens 6. The mirrors 7 and 5 are moved at relative speeds of two to one. The optical unit is moved at a constant speed from the left to the right by a PLL DC servo motor. The speed of movement is 180 mm/sec in a forward run during which the original is illuminated, and 468 mm/sec in a return run. A resolution power in the sub-scan direction is 16 lines/mm. Sizes of the originals which can be processed are A5–A3, and the orientations of mounting of the original are vertical orientations for A5, B5 and A4 and horizontal orientations for B4 and A3. Three return points for the optical unit are provided to comply with the different sizes of the original. A first point which is common to A5, B5 and A4 is at 220 mm from the original reference position, a second point for B4 is at 364 mm and a third point for A3 is at 431.8 mm.

A width of a main scan is equal to a lateral length (297 mm) of the size A4 original. (See FIG. 11). In order to attain the resolution power of 16 pels/mm, the CCD requires 4752 ($=297\times16$) bits. Thus, the present embodiment uses two 2628-bit CCD array sensors, which are driven in parallel. Under the conditions of 16 lines/mm and 180 mm/sec., a main scan period T (equal to a storage time of the CCD) is equal to $1/(v\cdot n)=1/(180\times16)=347.2$ μsec. A transfer rate of the CCD is equal to $f=N/T=2628/(347.2 \ \mu sec)=7.569$ MHz.

The printer B arranged under the reader A in FIG. 2 is now explained. A bit-serial video signal processed by the reader A is supplied to a laser scan optical unit 25 of the printer. The optical unit 25 comprises a semiconductor laser, a collimeter lens, a rotating polygon mirror, an F-$\theta$ lens and a correction optical system. The video signal from the reader is applied to the semiconductor laser which converts it to a laser beam, which is collimated by the collimeter lens and impinged to the polygon mirror rotated at a high speed. The laser beam thus scans a photosensitive member 8. The polygon mirror is rotated at 2600 rpm. A scan width is approximately 400 mm and an effective image width is equal to the lateral length (297 mm) of the size A4 original. Thus, a signal frequency applied to the semiconductor laser is approximately 2 MHz (NRz) as will be explained later. The laser beam from the unit is applied to the photosensitive member 8 through a mirror 24.

The photosensitive member 8 may have three layers, a conductive layer, a photosensitive layer and an insulative layer. Process components for forming an image on the photosensitive member 8 are provided. Numeral 9 denotes a pre-discharger, numeral 10 denotes a predischarge lamp, numeral 11 denotes a primary charger, numeral 12 denotes a secondary charger, numeral 13 denotes a flat exposure lamp, numeral 14 denotes a developing unit, numeral 15 denote a paper cassette, numeral 16 denotes a paper feed roller, numeral 17 denotes a paper feed guide, numeral 18 denotes a registration roller, numeral 19 denotes a transfer charger, numeral 20 denotes a separation roller, numeral 21 denote a convey guide, numeral 22 denotes a fixing unit and numeral 23 denotes a tray. The well-known electrophotographic process is carried out by those process means to print out an image. The speeds of the photosensitive member 8 and the convey system are 180 mm/sec., which is equal to the scan speed of the reader. Thus, a copying speed when the reader and the printer are combined is 30 sheets/min for the size A4 original. The paper feed roller 16 and the registration roller 18 are timed by the signals from the reader.

The printer uses a separation belt 200 (FIG. 14B) to separate the copy paper contacted to the photosensing drum. Accordingly, the video signal is eliminated at the area corresponding to the belt width 201. If the signal is inserted in this area, the development occurs in this area and the separation belt is contaminated by toner and the papers are also contaminated. Thus, the reader cuts the video signal for the print out at the area corresponding to the separation belt width (8 mm). If toner is deposited on a leading edge of the copy paper, the copy paper may be wrapped around the fixing roll and jammed. Therefore, the reader also cuts the video signal at an area corresponding to 2 mm width 202 (FIG. 14B) at the leading edge of the copy paper in order to prevent the deposition of the toner. FIGS. 14A and 14B show the directions of main scans of the reader and the printer and the output image. The reader scans from the front side to the rear side and the printer scans from the front side to the rear side.

The copying machine of the present embodiment has an intelligency such as image edition. This intelligency is imparted by the reader by processing the signal read by the CCD. The reader always outputs a signal of a fixed bit length (4752 bits) at a fixed rate (13.89 MHz). The intelligency functions include magnification reduction at any scale between 0.5–2.0, magnification/reduction at a specified scale, a triming function to extract a specified area of an image, a moving function to move the trimmed image to a desired area on the copy paper and a magnification/reduction function to magnify or reduce the trimmed image at any scale. They also include a half-tone processing function with 32 tones in response to key input. They further include combined functions of those intelligent functions. These are illustrated in FIG. 16.

Figure 16A:
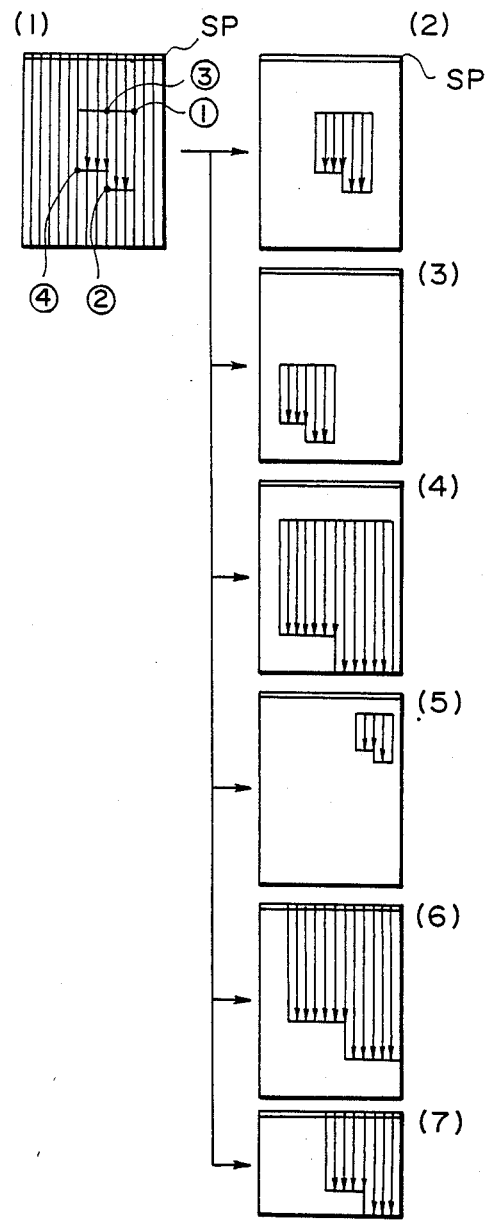

FIG. 16(a) shows the edit fuction. (1) shows an original surface, (2) shows a copy when only trimming coordinates were specified, (3) shows a copy when the trimming coordinates and movement coordinates were specified (an error is indicated if the coordinates exceed the size of the copy paper), (4) shows a copy when the trimming coordinates and the movement coordinates were specified and a magnification at any scale was specified (an error is indicated if the coordinates exceed the size of the copy paper), (5) shows a copy when the trimming coordinates and the movement coordinates were specified and a reduction at any scale was specified, (6) shows a copy when the trimming coordinates were specified and an AUTO function (to automatically magnify or reduce the trimmed image within a scale range of 0.5-2 and align an edge of the magnified or reduced image to the reference position SP in accordance with the size and the orientation of the paper) was specified, and (7) shows a copy when the trimming coordinates and the AUTO function were specified for a smaller copy paper. The trimming coordinates to be shifted to the movement coordinates are determined by referencing a smallest coordinate point ① in the direction of sub-scan.

Figure 16B:
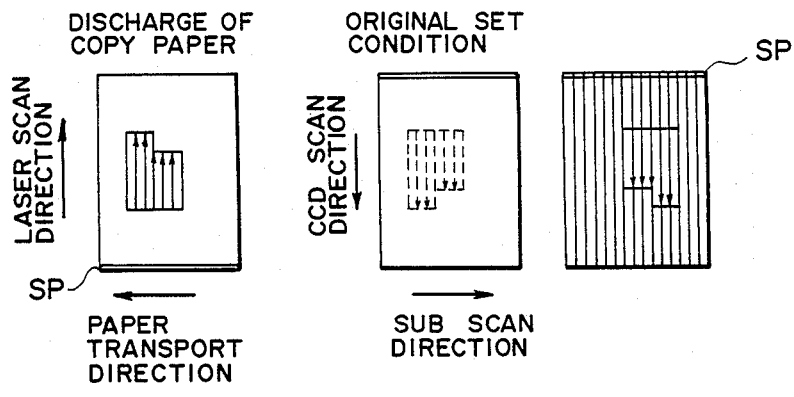

FIG. 16(b) shows a relation between the CCD and the main scan direction of the laser.

Figure 16C:
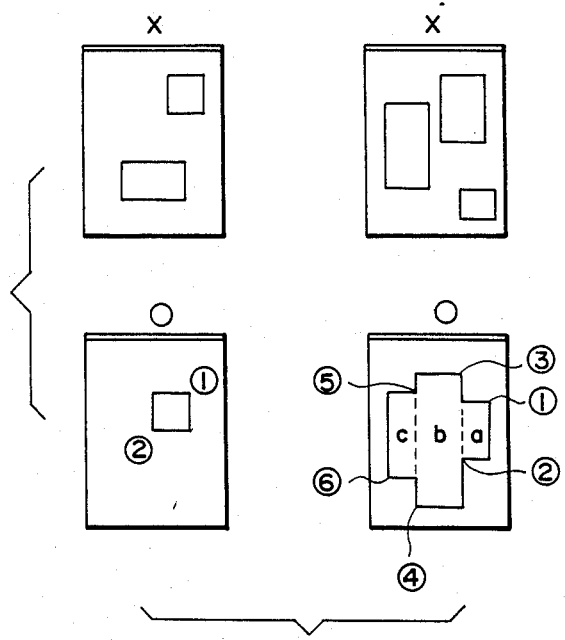
Figure 17A:
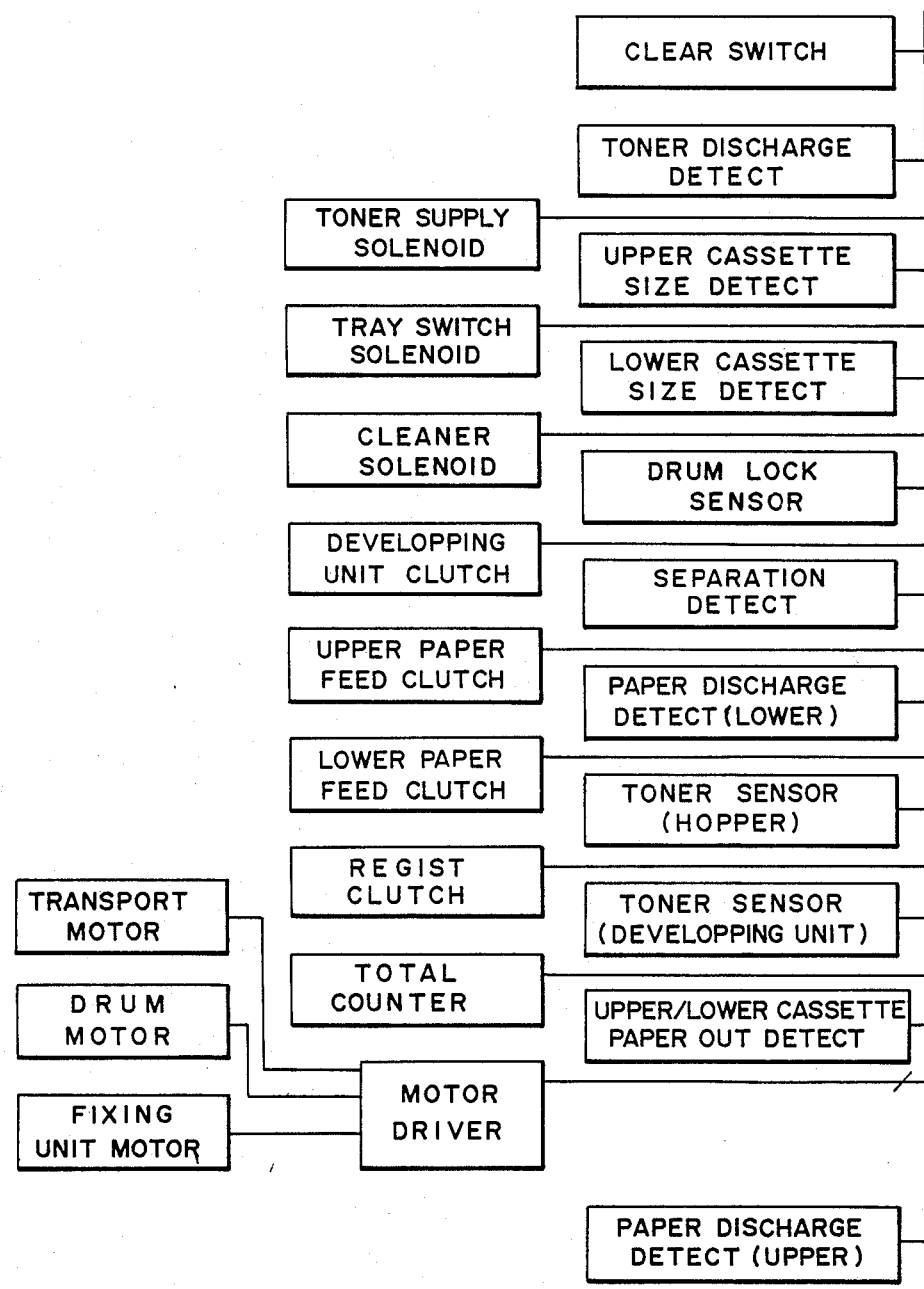
Figure 17B:
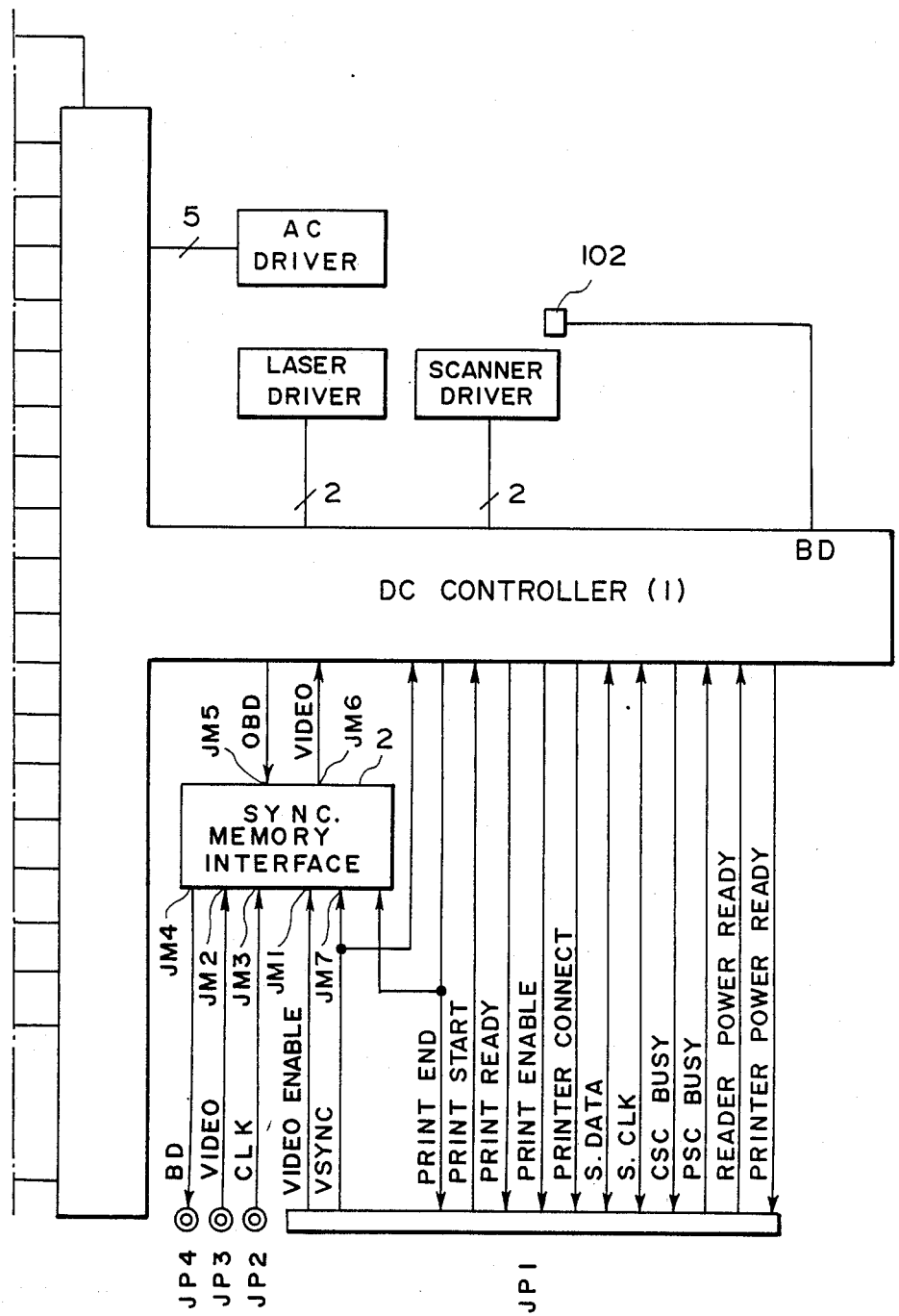

FIG. 16(c) shows procedures for specifying the trimming coordinates.

If the area is a frame encircled by straight lines, the order of specification follows ①-⑥. The coordinates are specified by a ten-key 12a shown in FIG. 4. By dividing the area into three rectangles a, b and c and specifying coordinates on diagonals, the trimming area can be specified.

Figure 1A:
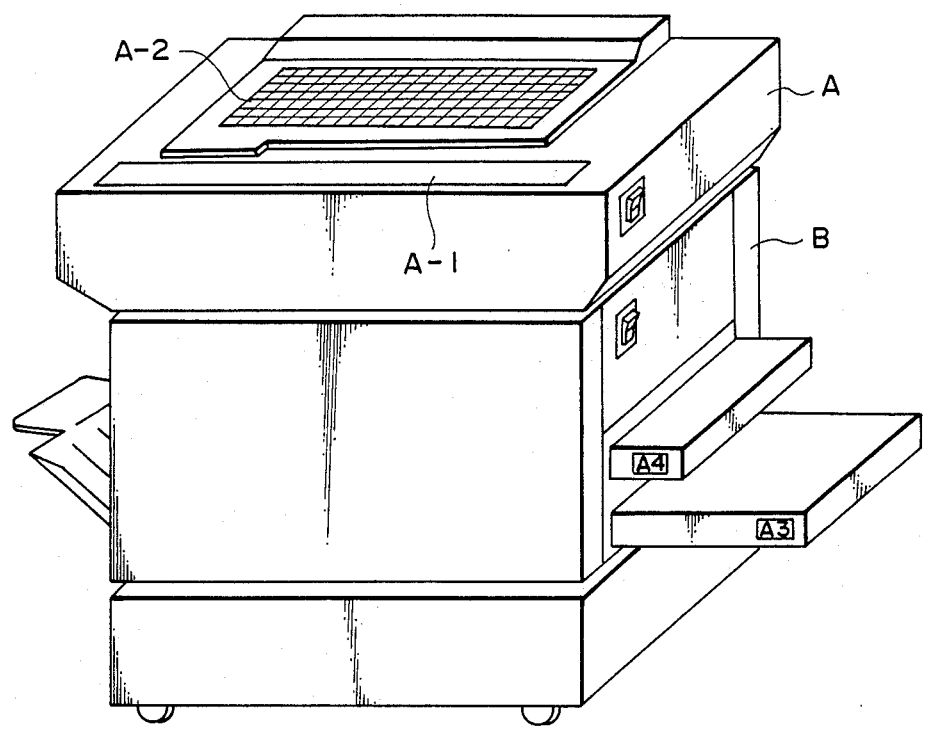
FIG. 1A is a perspective view of an image forming apparatus to which the present invention is applied.
Figure 1B:
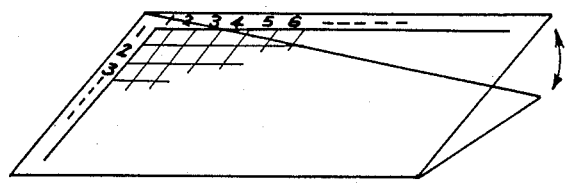
FIG. 1B is a perspective view of a document holder.

FIG. 1B shows a transparent holder A-2 which can be held between the original cover 4 and the glass 3. The holder is bag-like and two edges thereof are bonded. It has the same width as the glass 3. A section pattern is drawn on one side of the bag-like holder, and coordinates 1−n and 1−m are drawn at an interval of 1-10 mm on vertical and horizontal edges of the section pattern. The coordinate points correspond to the points on the glass. When the original is inserted into the bag-like holder, with the image plane of the original facing the coordinate plane, the respective points on the original image are indicated by the coordinates. Thus, an operator can enter the trimming coordinates and the movement coordinates by the keys of the control unit A-1 while watching the holder. After the key entry, the original is turned over and again inserted in the holder and the holder is mounted on the predetermined position on the glass, or the original is taken out of the holder and mounted on the glass. If the coordinates are drawn by a paint to which the CCD is insensitive, the original may be mounted on the glass while it is held in the holder. The holder may have three edges or one edge thereof bonded. When the one edge bonded holder, that is, a folded sheet is used, the coordinates can be readily specified even if the original is thick or a book.

Figure 3:
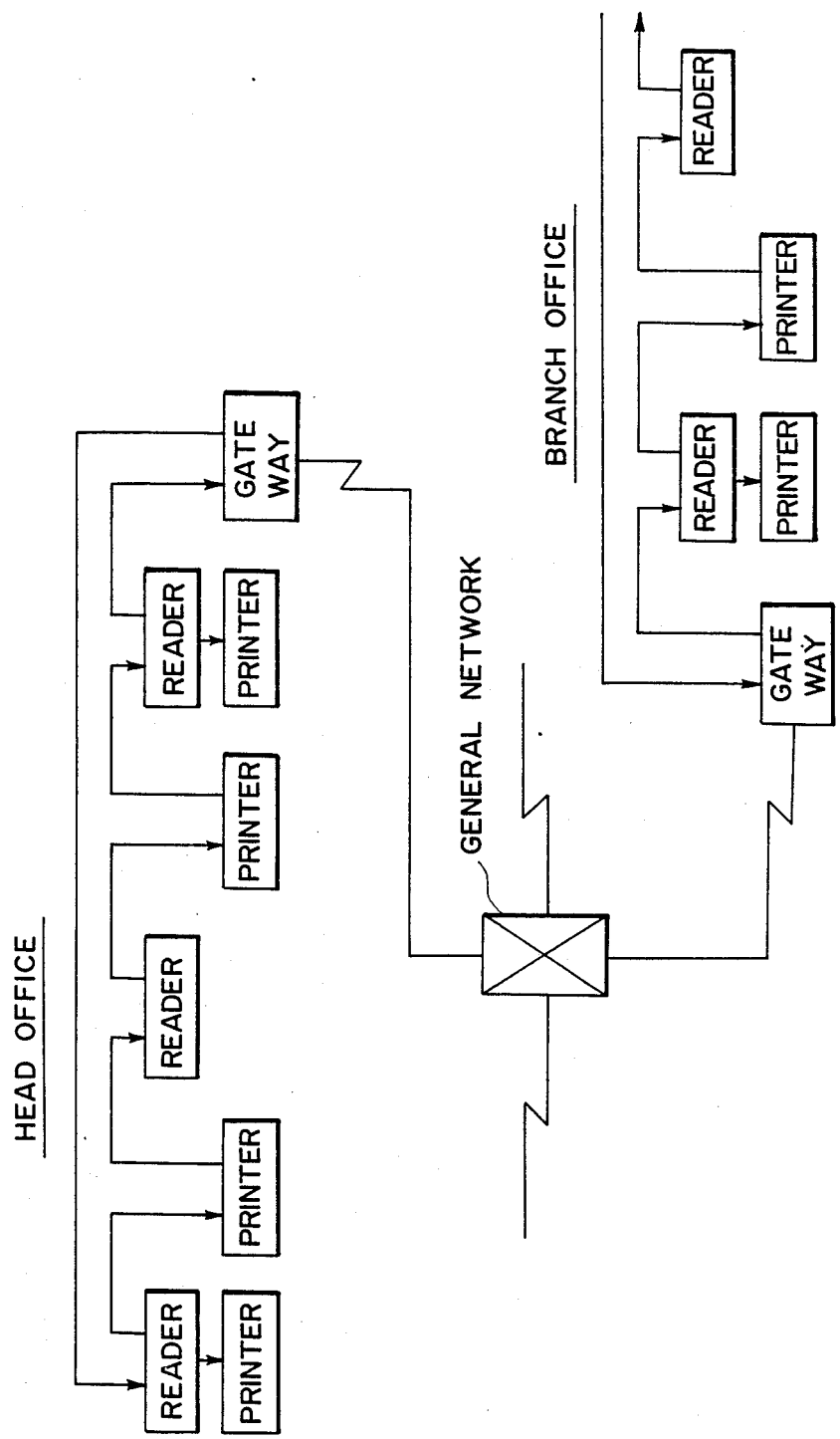
FIG. 3 is a block diagram of a local network to which the apparatus of FIG. 1A is connected.

FIG. 3 is a network diagram which shows a combination of reader and printer modules and a looped connection of the modules. A main office and a branch office each constitutes a local network.

In the present system, the image information is the electrical signal, and the reader and the printer are separated and have independent functions. Accordingly, it is possible to transmit the image information between those units. In the present system, when the reader/printer is used in a set or only the reader is used, a communication module 40a (FIG. 6) to be explained later is attached to the reader. When only the printer is used, the communication module is attached to the printer. By connecting the units in a loop, an in-house local communication is attained. For an out-of-house communication, a gate way (interface between a public line and the local network) is arranged in the loop. An electronic mailing system can be constructed between the main office and the branch office having their copying machines connected to the network.

Figure 4:
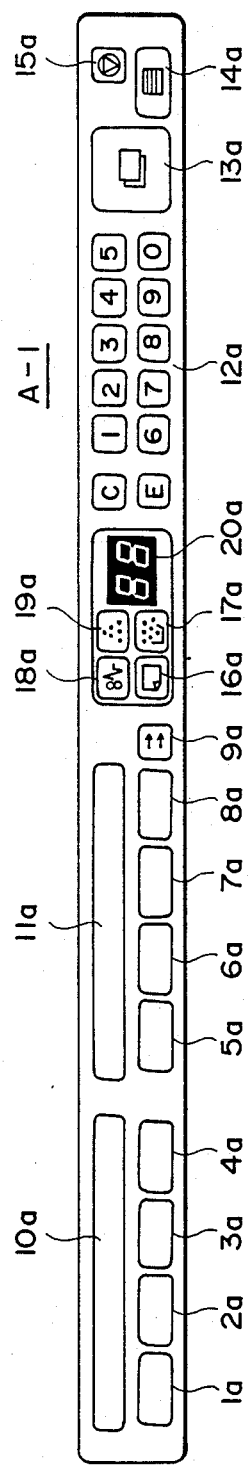
FIGS. 4 and 5 are plan views of control panels shown in FIG. 1A, FIG. 6 composed of FIGS. 6A to 6D is a circuit block diagram of an image processing unit, shown in FIG. 1A, FIG. 7 composed of FIGS. 7A and 7B shows time charts for the operation of FIG. 6, FIGS. 8 and 9 show time charts for the operation of FIG. 6, FIG. 10 composed of FIGS. 10A to 10C shows circuit diagrams in FIG. 6, FIG. 13 composed of FIGS. 13A to 13C shows circuit diagrams in FIG. 6, FIGS. 11 and 12 illustrate correction of CCD junction.

FIG. 4 shows a detail of the control console A-1 of the reader A. It is used when the reader is singly used or the reader and the printer are used in a set. Numerals 10a and 11a denote 5×7-dot matrix liquid crystal displays each having twenty digit positions. The display 10a is a standard feature and the display 11a is an optional feature which is added when the communication function is required. Guidances from the machine (querries to magnification scale, trimming coordinates, movement coordinates, etc.) are displayed on the displays, and a desired one of the displayed guidances is selected by depressing corresponding one of soft keys 1a–8a arranged below the displays. If a desired guidance is not found in the display, an operator depresses an etc key 9a and the contents of the guidances change sequentially. Thus, the operator may continuously depress the etc key until the desired guidance is displayed. A copy count display is a 7-segment LED display separate from the liquid crystal displays so that the operator can identify it from a distant point. Numerals 16a–19a denote alarm indicators of the printer. The indicator 18a indicates a jam of a print paper, the indicator 19a denotes a lack of developing agent in the developing unit, the indicator 16a indicates a lack of copy paper in the cassette, and the indicator 17a indicates an exhaust toner overflow in a drum cleaning vessel. Those alarms are also displayed on the liquid crystal dot displays as messages by status data (to be described later) from the printer. Numeral 12a denotes a ten-key which is used to enter a copy count, a destination dial number, a transmission copy count, trimming coordinates, movement coordinates of reproduced image and a magnification scale. The end of entry is indicated by a key "E". Numerals 13a and 14a denote copy/transmission start keys. When the key 13a is depressed, the image is outputted in binary form (line image), and when the key 14a which is a half-tone copy key is depressed, an image represented in 32 tones by dither method is outputted. Numeral 15a denotes a stop key to stop the copy operation.

Figure 5:
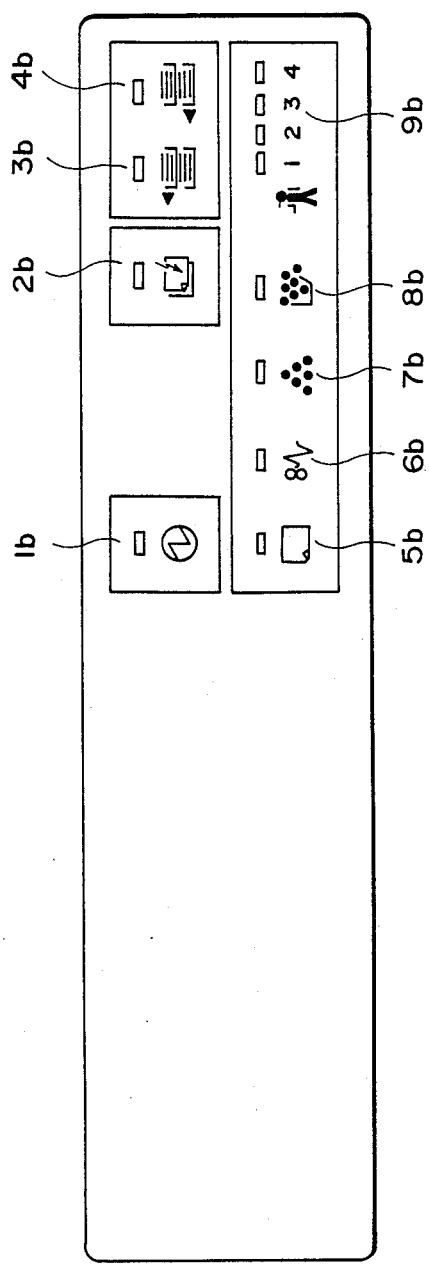

FIG. 5 shows a display of the printer which is used when the printer is used singly in the network. Numeral 16 denotes a power lamp, numeral 2 denotes a reception lamp, numerals 3b and 4b denote indicators for cassettes used, numeral 5b denotes a lack-of-paper lamp, numeral 7b denotes a lack-of-toner lamp, numeral 8b denotes an exhaust toner overflow lamp, and numeral 9b denotes a service man call lamp. The lamps 7b and 8b are lit when the toner is exhausted or the exhaust toner overflows during the print operation but the print operation is permitted until the papers in the cassette are exhausted. This is also true for the console of FIG. 4. When one of the lamps 5b–9b is lit, an alarm sound is generated in case the machine is operated without an operator. The same is true when one of the lamps 16a–19a of FIG. 4 is lit.

Figure 6A:
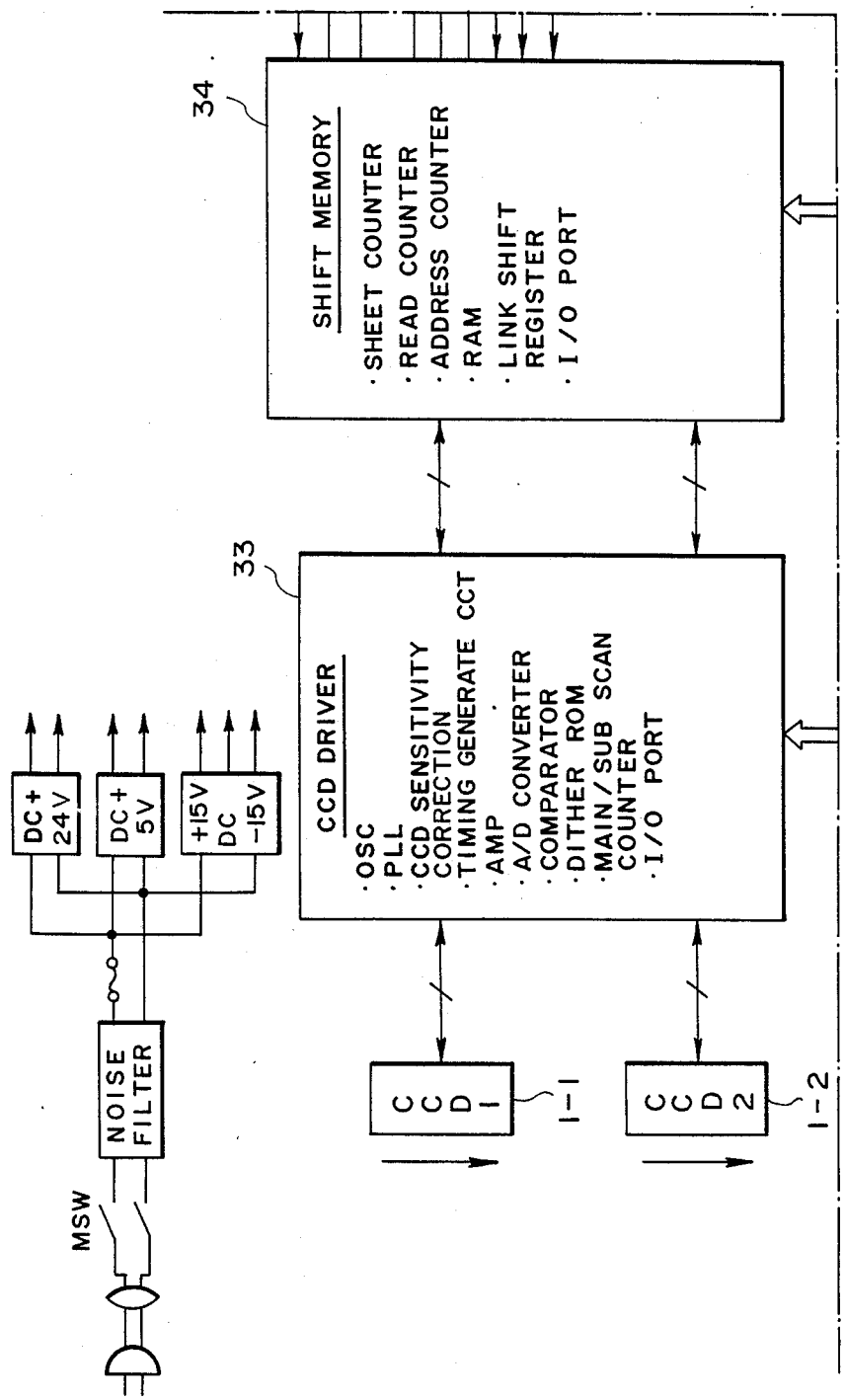
Figure 6B:
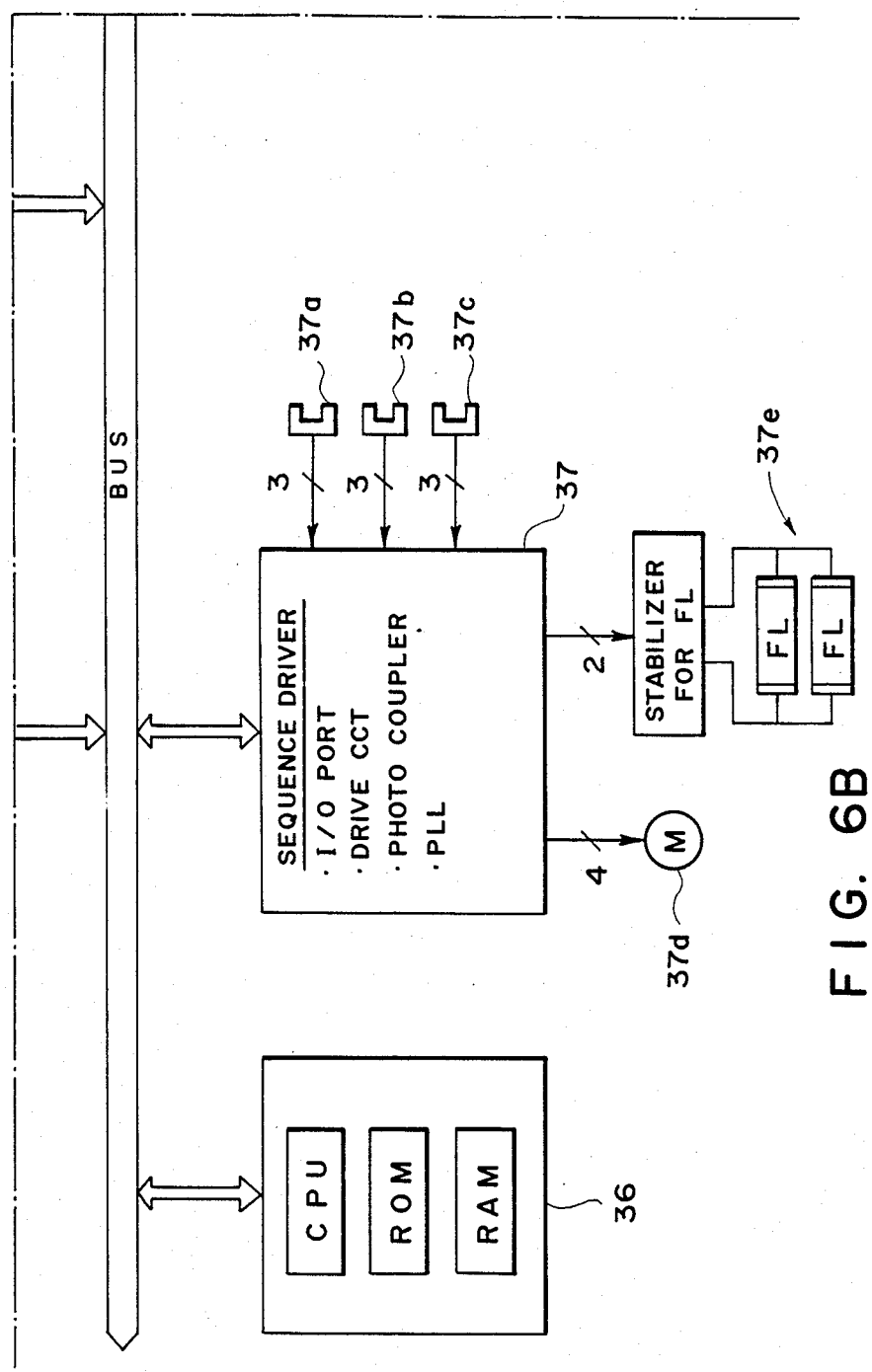

A detail of the reader unit is now explained. FIG. 6 shows a system block diagram of the reader unit.

Figure 10:
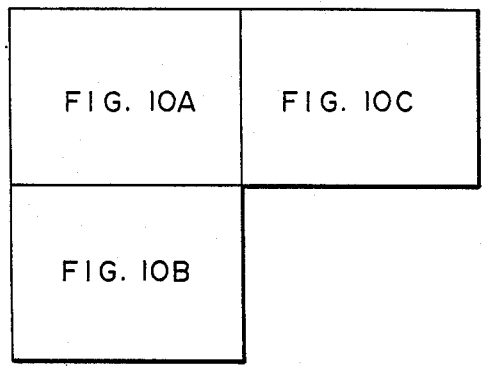
Figure 13:
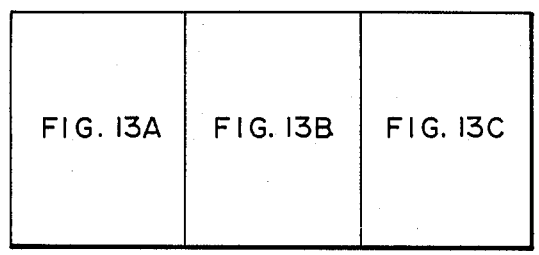

Numerals 1-1 and 1-2 denote CCD's, numeral 33 denotes a CCD driver which drives the CCD and A/D converts and digitize the image output of the CCD, numeral 34 denotes a shift memory which trims, shifts, and magnification/reduction processes the image signal of the driver 33 (a detail is shown in FIG. 13), numeral 35 denotes a data serial-to-parallel converter for protocoling with the printer, numeral 36 denotes a microcomputer which sends and receives control data to and from the respective blocks through a bus line BUS and which has a program ROM and a data RAM, and numeral 37 denotes a sequence driver which controls a movement sequence of the optical system for the subscan as shown in FIG. 10. It receives signals from a home position sensor 37a arranged in a movement path of the optical system, an image edge sensor 37b and a print start position sensor 37c and controls the paper feed roller 16, the registration roller 18 in the printer unit and a sub-scan DC motor 37d and an original exposure lamp 37e. The sensors are constructed by photointerrupters which are actuated by a light shielding cam mounted in the block of the first mirror 7. Numeral 38 denotes a bus interface for inputting and outputting data to and from the unit 38a of the console A-1 of FIG. 4, and numeral 39 denotes a bus interface for inputting and outputting data to and from a communication key/display unit 39a, not shown.

Figure 7A:
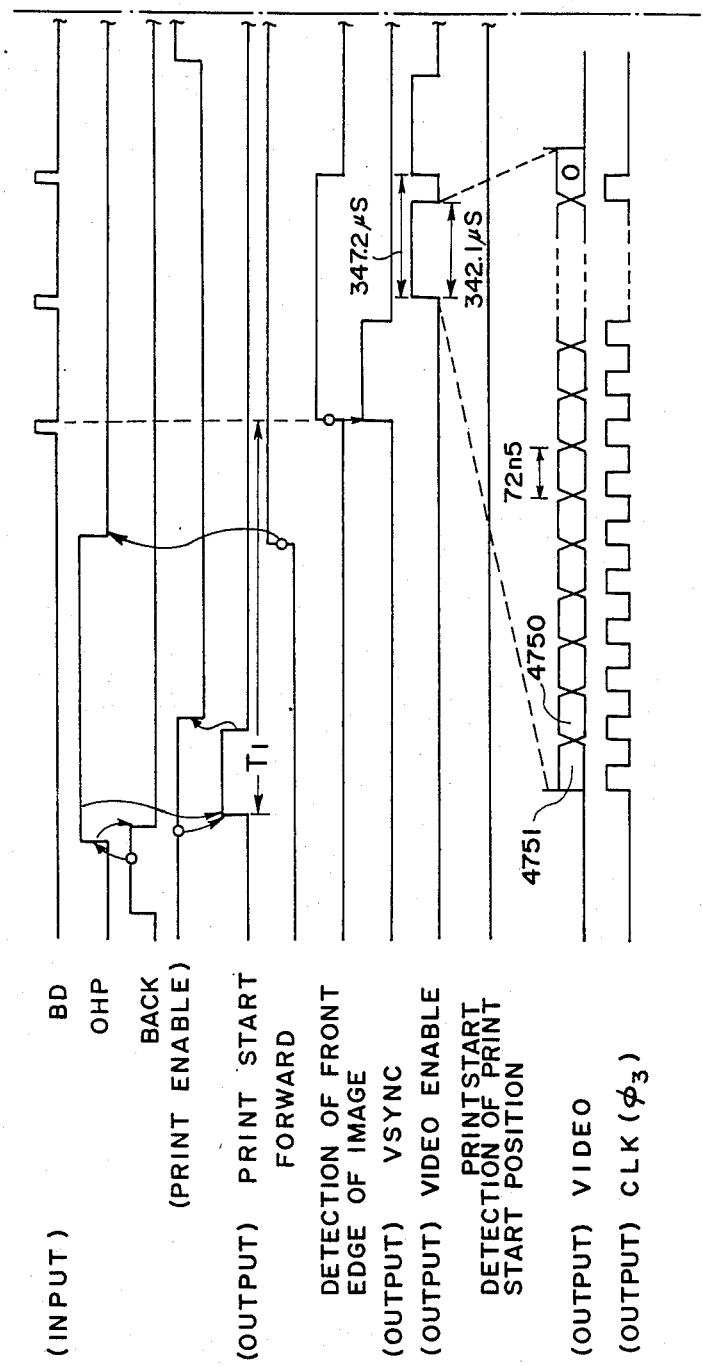
Figure 7B:
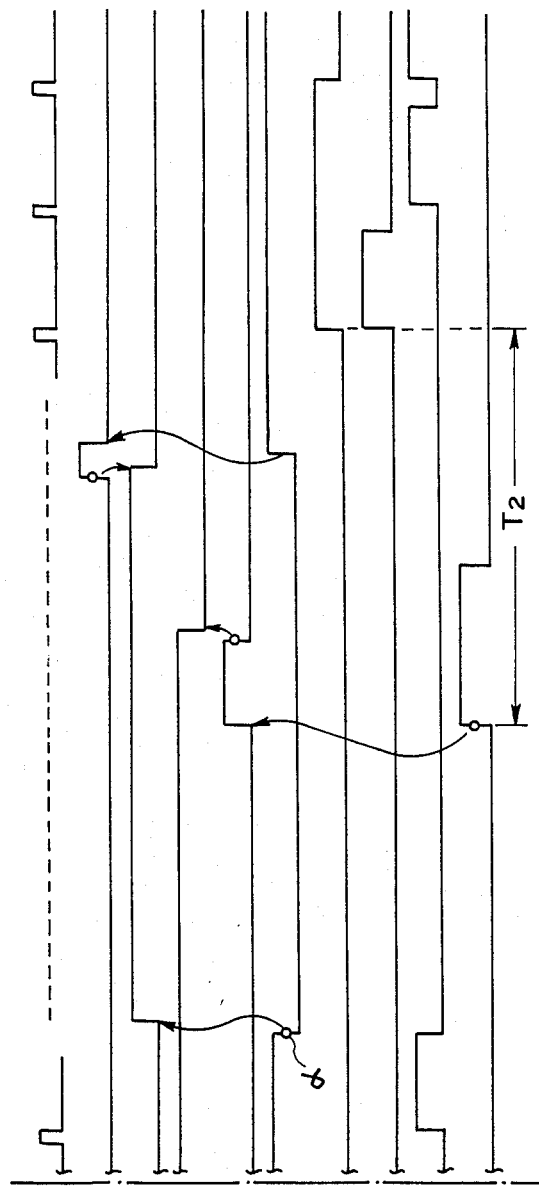
Figure 7:
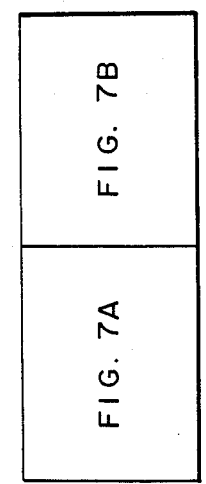
Figure 8:
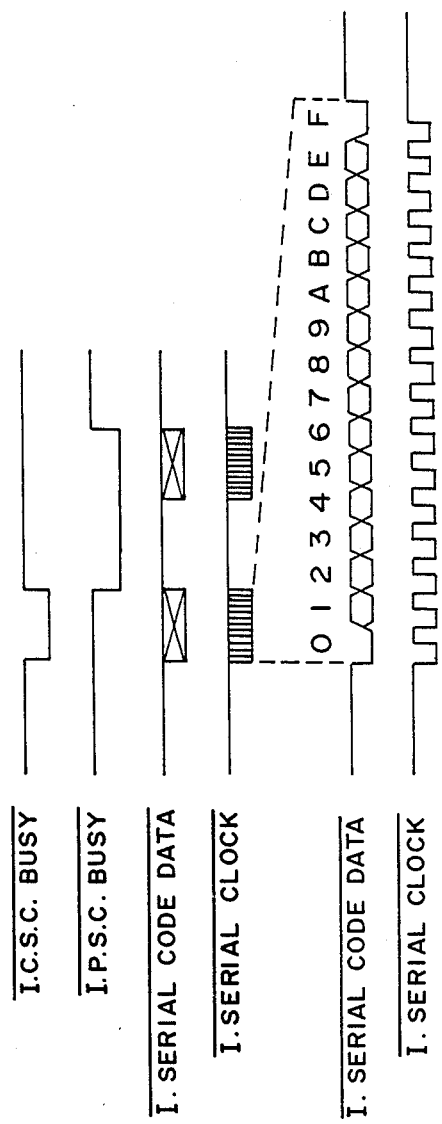

Interface signals to the reader are shown on the right hand. When the reader is connected to the printer, connectors JR1, JR2, JR3 and JR4 are connected to connectors JP1, JP2, JP3 and JP4 in the printer, respectively. Thus, when it is used as a mere copying machine, the connectors JR and the connectors JP are simply connected. When the reader and the printer are used in a set and they are communicated with an external unit, the signals which are in nature to be sent to the connectors JR1, JR2 and JR3 are supplied to the communication interface module 40a, thence they are supplied to the connectors JR1, JR2 and JR3. Thus, the connectors JR1, JR2 and JR3 are connected to the printer through the module 40a in the reader. The module 40a includes a modulator and a demodulator for communication. The connector JR4 is directly connected to the connector JP4 of the printer. The communication interface is connected to optical connectors JR7 and JR8 or coaxial connectors JR5 and JR6. Either the optical connectors JR7 and JR8 or the coaxial connectors JR5 and JR6 are selected. For a long distance transmission, the optical connectors are selected and for a short distance transmission the coaxial connectors are selected. In this manner, the signals from the connectors JR1-JR3 of the reader A are sent out through the modulator of the module 40a and the fibers to another printer, and the signals from the connectors JR1-JR3 of another reader are sent to the connectors JR1-JR3 through the fibers and the demodulator of the module 40a, and they are sent to the printer B. Timings of the interface signals of the connectors JR1-JR4 are shown in FIGS. 7 and 8.

The beam detect signal BD at JR4 functions to synchronize the output of the image data VIDEO to the printer with the rotation of the printer scanner (polygon mirror 100 in FIG. 14B) when the printer B is connected. It corresponds to a leading edge signal of the scan line by the scanner. The signal BD is produced by a beam detector 102 (FIG. 14B) when the detector 102 detects the laser beam of the printer. Signals VIDEO and CLK are a video signal and a clock, respectively, which are produced 4752 times per line in 72 nsec width. When the printer is connected, this signal is produced in synchronism with the beam detect signal, and when the printer is not connected (transmission to other unit), it is produced in synchronism with an internal psuedo signal. The CCD readout is started by a signal HSYNC which is generated by an AND function of the signal BD and a clock $\phi_1$. A signal VIDEO ENABLE is produced while the 4752-bit video data is outputted. It is also produced in synchronism with the beam detect signal or the internal psuedo signal. A signal VSYNC is produced in synchronism with the output of the image leading edge sensor 37b and the beam detect signal or the internal psuedo signal. It indicates that the video data follows. The signal width thereof is same as that of the signal VIDEO ENABLE. A signal PRINT START commands the paper feed of the roller 16 to the printer. A time interval between the signal PRINT START and the signal VSYNC and a time interval between the output of the sensor 7b and the signal VSYNC when the registration roller 18 is actuated by the signal VSYNC are determined by a control circuit (FIGS. 10 and 13) while taking into consideration of the image shift, the magnification scale and the trimming area. A signal PRINT END is a response signal from the printer and it is produced when a trailing edges of the copy paper moves away from the photosensing drum and reaches the convey belt to indicate the end of print operation. It detects the end of separation of the copy paper but produced by a sequential timing. A total copy count is incremented by this signal and a jam loss count is corrected based on the total copy count. A signal ABX CONNECT indicates that the communication interface module 40a has been connected. When the communication interface module is connected, this terminal in the module is connected to GND to establish a communication active state. A signal PRINTER CONNECT is produced when the printer is connected. This terminal is connected to GND to establish a print active state.

S. DATA, S. CLK, CSC BUSY and PSC BUSY are serial signal lines to protocol (information exchange such as permission of transmission and signals) between the reader and the printer. Details thereof will be explained later. S-DATA and S.CLK are 16-bit protocol data and clock lines which are bilateral lines. CSC BUSY is produced when the data command and clock are produced by the reader on the lines S. DATA and S. CLK, and PSC BUSY is produced when the data command and the clock are produced by the printer on the lines S. DATA and S. CLK. Accordingly, those lines indicate the transmission directions of S. DATA and S. CLK. Details will be explained with reference to FIG. 8. Thus, the set of reader and printer connected through the connectors or the reader printer connected through the fiber are efficiently and correctly operated.

Returning to FIG. 6, the heart of the control of the reader unit is a CPU in the microcomputer 36. The roles of the CPU are to control the key/display unit, control the sequence, the optical fiber communication protocol and the printer protocol, and preset values calculated in accordance with the image processing commands such as trimming area, shift position and magnification scale from the key/display unit, to the address counter of the shift memory in the discrete image processing circuit. The CCD driver 33 supplies a power supply, the timing signal and the clock to CCD's 1-1 and 1-2 to drive them, and receives photoelectrically converted serial signals of the original image from the CCD's in accordance with the timing, amplifies them and analog-to-digital converts them. The shift memory 34 converts the two channels of digitized video signals from the two CCD's to a non-overlapping serial signal to produce a serial video signal of 4752 bits/line and the timing signals including CLK. The serial-to-parallel converter 35 is an interface to the CPU which converts the serial signal for protocoling with the printer to a parallel signal to allow the direct connection with the bus line of the CPU. The sequence driver 37 includes interfaces to the three sensors arranged on the path of the optical system, a light source fluorescent lamp driver, a sub-scan DC motor driver and a speed control PLL circuit. The bus interfaces 38 and 39 are interfaces to the control keys of FIG. 4, a driver for the 5×7-dots 20-digits liquid crystal and the CPU bus line BUS. As an option, a bus interface 40 for coupling the communication interface module 40a and the CPU and protocoling them is included.

Figure 9:
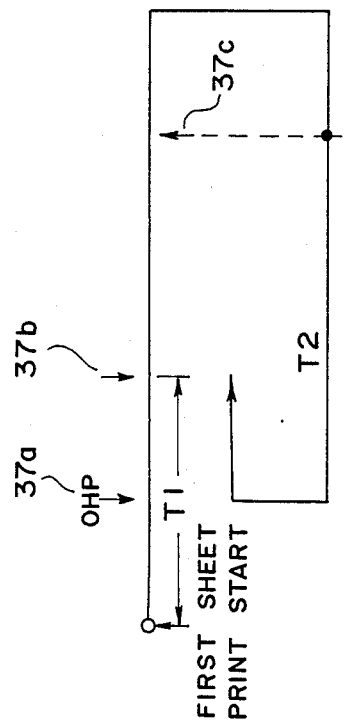

The sequence control is now explained with reference to FIGS. 9 and 7. As shown in FIG. 9, three position sensors 37a-37c are arranged on the scanning optical system of the reader. As viewed from the front of the reader, the optical system home position sensor (which produce a signal OHP) is at the leftmost position, and the optical system is normally stopped at this position. When the reader is driven, the optical system starts to scan from left to right. The image leading edge sensor 37b is arranged at the reference position SP of the image. When the control circuit detects a signal from the sensor 37b, it produces the video data signal (VIDEO, CLK) in synchronism with the signal BD and produces a signal indicating a data enable period (VIDEO ENABLE) in each main scan cycle (347.2 µs). In the first line, the CCD signal is stored in the shift memory and hence the signal VIDEO ENABLE is not produced. The control circuit responds to the signal from the sensor 37b to start the number of VIDEO ENABLE signals, and when the count reaches a count α corresponding to a first point, a second point or a third point depending on the cassette size of the printer or the magnification scale, the control circuit blocks an optical system forward drive signal and produces a backward drive signal to reverse the optical system. In the return path, the print start sensor 37c is arranged. When the optical system actuates the sensor 37c during its backward movement, the control circuit checks if the optical system scanned the number of times corresponding to the specified number of copies, and if the number of times of scan does not coincide with the specified number of copies, it produces the print start signal to issue the next paper feed command to the printer. It is important that the position of the sensor 37c is adjusted such that $T_2$ and $T_1$ in FIG. 9 are equal.

Magnification/Reduction

The method for magnifying/reducing the original image is now explained with reference to FIG. 10. A principal operation of magnification/reduction is to vary a speed of the DC servo motor 37d in the sub-scan direction. The CPU calculates the speed based on a key-input magnification/reduction scale and calculates a PLL frequency corresponding to the speed and presets it to an I/O latch (1) 58 prior to the scan. During the return cycle, a fixed value is set so that the optical system is returned at a high speed. It is done by presetting a value stored in the ROM of the CPU to the I/O latch (1). When the magnification scale is two, the speed is one half of that for a unity magnification scale (180 mm/sec), and when the magnification scale is ½, the speed is double. The main scan is carried out by sampling the serial signal of the CCD (after the A/D conversion) sent at the fixed frequency, at a clock rate determined by the magnification scale. For example, when the magnification scale is two, the serial signal is sampled at a clock rate which is double of the clock rate of the CCD so that the resulting data includes one additional bit for each bit, and when the magnification scale is ½, the serial data is sampled at one half of the clock rate of the CCD so that the one bit out of every two bits of the data is omitted. The CPU calculates the clock rate based on the input magnification scale and presets it to an I/O latch (2) 50 prior to the sub-scan. As described above, each CCD comprises 2628 bits, of which 36 bits are dummy bits and 2592 bits are effective bits. A drive frequency therefor is 7.569 MHz and a signal line is a $\phi_1$ clock line 55. The clock for the magnification is generated by synchronizing the clock from the same source as that of the clock $\phi_1$ and the frequency generated by a VCO (9) based on the content of the I/O latch (2), by a PLL 48 to produce a variable frequency. The 2592-bits analog signal from the CCD is amplified by an amplifier AMP 42, an output of which is supplied to an automatic gain control (AGC) circuit 43. A white level of the original varies depending on a variation of a light intensity of the fluorescent lamp over a long time usage and a background tone of the original. The white level is sensed and a relative variation thereof is supplied to an A/D converter 44. The AGC 43 clamps the white level relative to the analog image signal of the amplifier 42. The output of the AGC 43 is A/D-converted by the A/D converter 44 which converts it to a 6-bit parallel digital image signal. A dither ROM 54 is preset such that weighted code (6 bits) is produced at an interval of 8 bits in the main scan direction and at an interval of 8 bits in the sub-scan direction. The matrix of $8 \times 8 = 64$ bits has 32 different weight codes assigned. By addressing the dither ROM 54 by a 3-bit main scan counter 51 and a 3-bit sub-scan counter 52, one of the different weighted codes is produced. A plurality of weighted code sets are set in the $8 \times 8$ matrix so that the reproduction of the half tone image is controlled by the selection of the sets. The selection of the sets is made by an I/O latch (3) 53, and the presetting to the latch is done by the CPU prior to the sub-scan. The main scan counter 51 is driven by the $\phi_2$ clock which is variable depending on the magnification scale, and the sub-scan counter 52 is driven by the beam detect signal. The 6-bit weighted code from the dither ROM 54 and the A/D converted 6-bit code are compared by a comparator 47 to produce a digital, serial image signal which can be half-tone reproduced. Thus, the sampling at a different clock rate means that the A/D converted code is compared with the weighted code produced at the clock rate $\phi_2$ which is different from the clock rate $\phi_1$ of the A/D conversion. If the comparison is made at the same clock rate as the clock rate $\phi_1$ and the magnification/reduction is made by simply adding or eliminating the bits in accordance with a predetermined algorithm, a result will be satisfactory for a normal digitized image. However, for a dithered half-tone image, a 45° dither pattern may be converted to a 30° or 60° pattern or a stepwise combination thereof and a smooth reproduction is not attained. Accordingly, in the present embodiment, the clock rate of the comparator is varied in accordance with the magnification scale.

In a circuit 45, the output of the A/D converter 44 is latched at $\phi_1$ for synchronization because the conversion time by the A/D converter 44 varies from bit to bit. As a matter of course, a write address counter 63 for shift memories 57-1 and 57-2 is driven by the $\phi_2$ clock. Thus, the shift memories 57-1 and 57-2 receive 2592 bits when the magnification scale is one, 1296 bits when the magnification scale is ½, and 5184 bits when the magnification scale is two. The shift memories thus need a capacity (two-line capacity) to accommodate not only the bits in the CCD (2592 bits) but also the bits added by the expansion. Since the image signal is stored in the shift memories after the magnification process and the dither process, the correct data of the memories can be outputted to a laser driver of the printer in accordance with a printer speed.

The speed of the sub-scan DC motor 37d is controlled by supplying the preset content of the I/O latch (1) 58 to a VCO 59, synchronizing the oscillation frequency of the VCO 59 with a source oscillation frequency by a PLL 60, and supplying the output of the PLL 60 to a servo circuit 61. A sub-scan stroke in the magnification/reduction mode may extend to the third point (431.8 mm) for any magnification scale. This is convenient for an automatic area designation for a continuous magnification scale process.

CCD Junction Correction

A method for automatically jointing two CCD's (in the main scan direction) is now explained.

Figure 11:
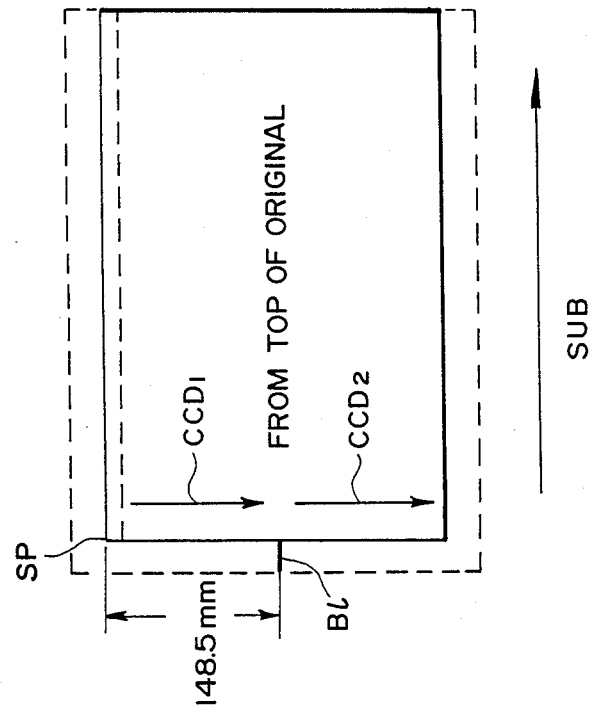
Figure 13A:
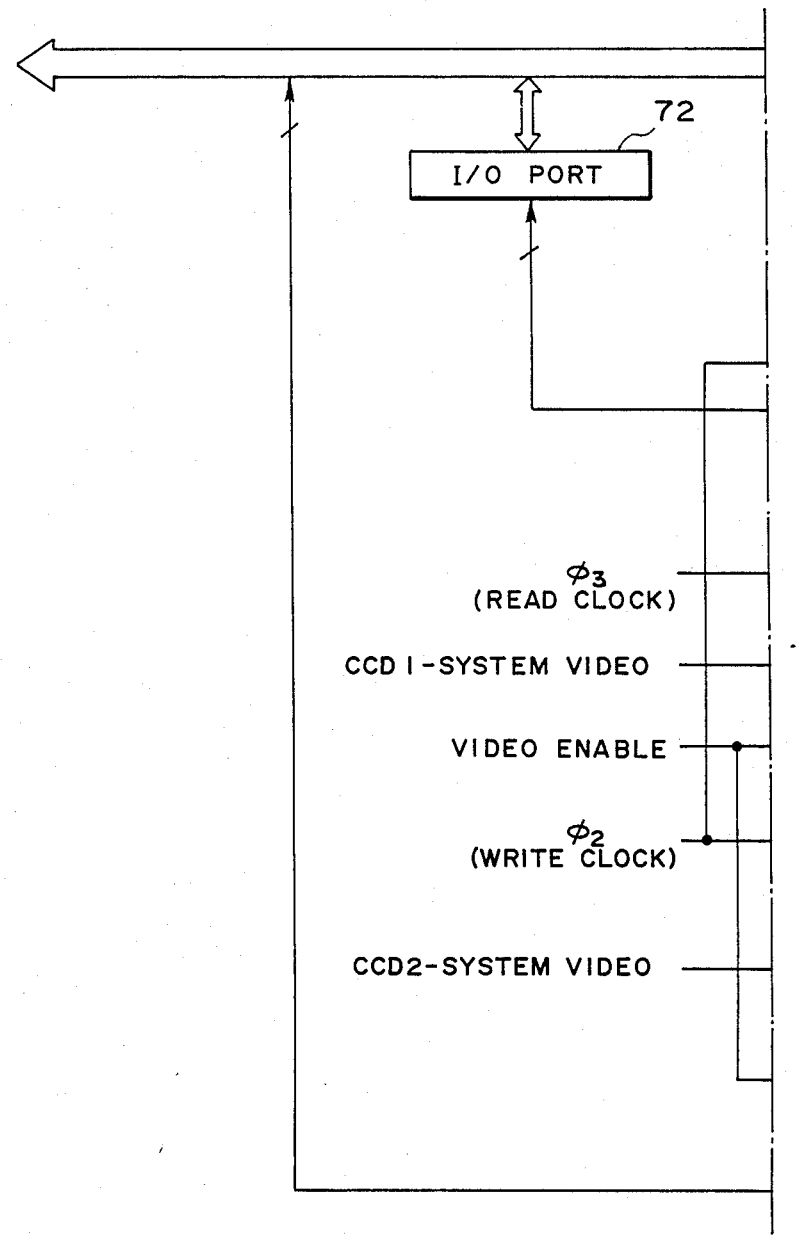
Figure 13B:
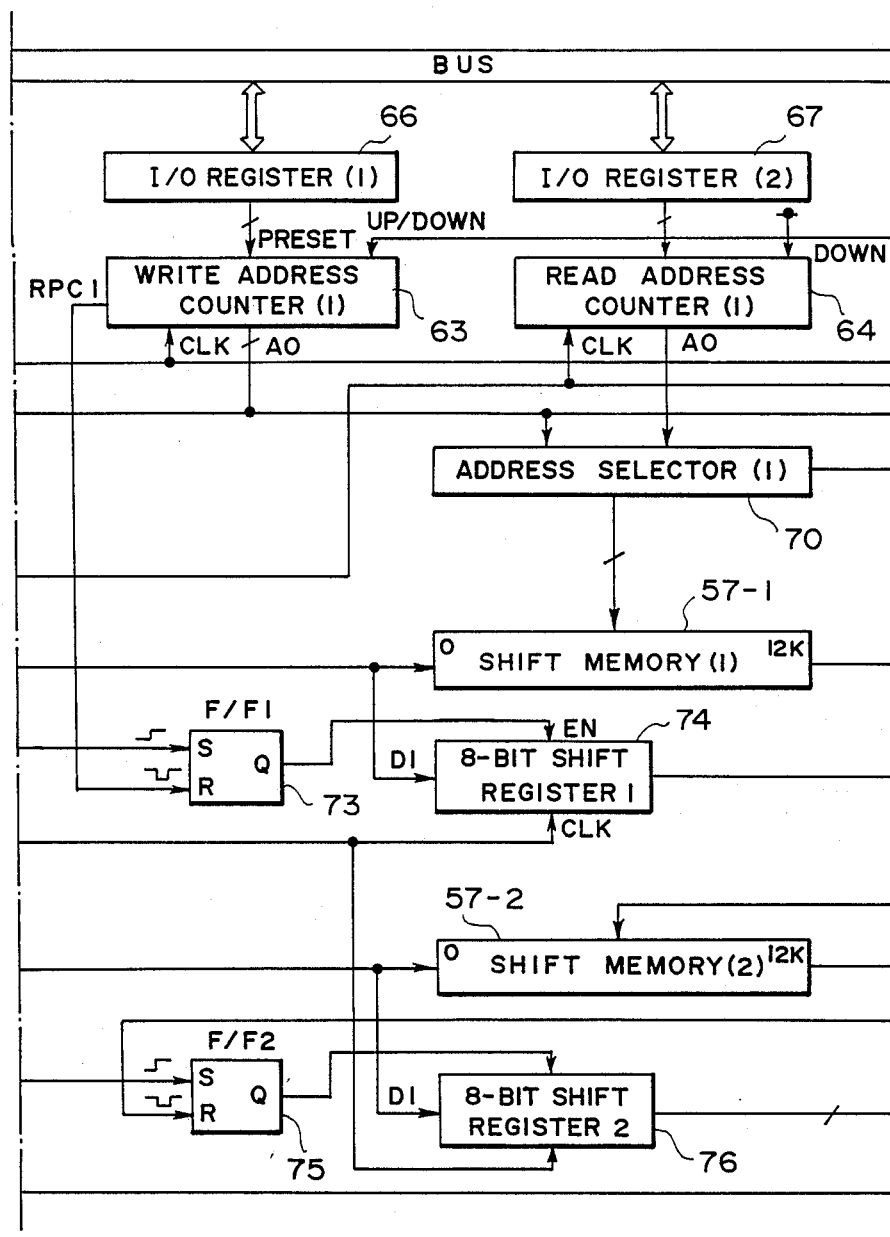
Figure 13C:
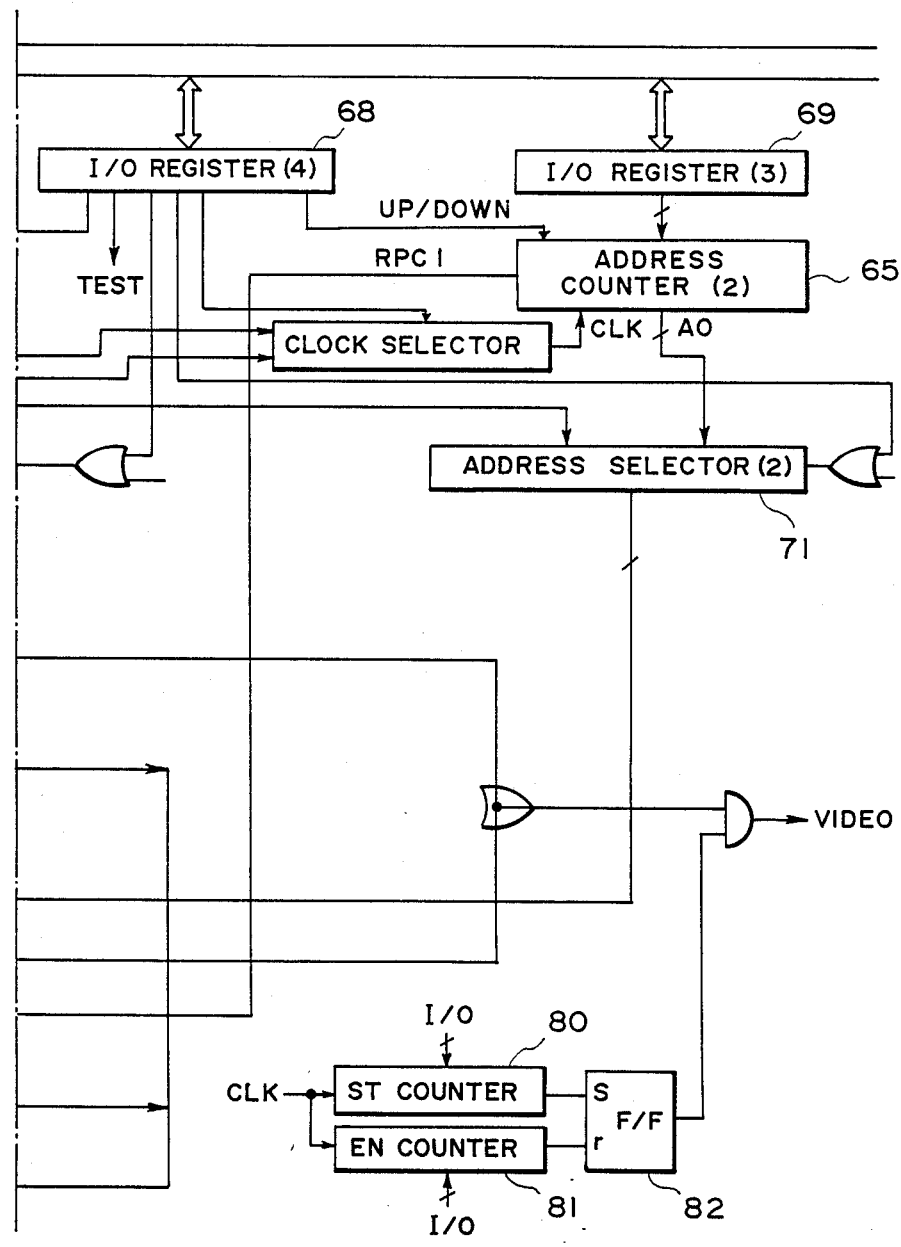

Referring to FIG. 11, a white plate is arranged to cover the main scan width on the home position (switch 37a) of the reader (optical system) so that the white plate is illuminated when the optical system is at the home position and the ligtt source is turned on. Accordingly, when the optical system is at the home position, the control circuit corrects to variation of the light intensity and the variations of the sensitivities of the two CCD's (shading correction).

A black narrow line Bl of 2 mm width extends in the sub-scan direction at a center of the white plate. It is used for the junction correction. The narrow line may be of any width which is an integer multiple of quantization width. When the optical system is at the home position and the light source is turned on, the black narrow line appears on the bits near the edges of the two CCD's. The CCD signals are supplied to the shift memories and the low order 128 bit of the CCD 1 signal are compared with the high order 128 bits of the CCD 2 signal. Each of the 128-bit data must have white bits in the beginning and the end and the black bits therebetween. The number of bits equal to a sum of the number of low order white bits of the CCD 1 and the number of high order white bits and the number of black bits of the CCD 2 is eliminated when the bits are read out of the CCD 2 shift memory. In FIG. 11, arrows for the CCD's, indicate the main scan direction, and the arrow for the sub-scan indicate the sub-scan direction.

FIGS. 12 and 13 illustrate a specific method. In order to write the image signal into the shift memories 57-1 and 57-2 which are static RAM's, the write address counter 63 and the read address counters 64 and 65 are provided. The quantity of information supplied to the memories from the CCD's changes in accordance with the magnification scale. In the present embodiment, the write address counter (1) for the CCD 1 is counted up starting from the LSB by the input clock $\phi_2$ to count the number of pixels of the CCD scan. The final count is stored in the RAM of the CPU. When the magnification scale is one, the final count is 2592. In order to extract the low order 8 bits of the CCD 1 (the first bit which appears in the main scan is MSB) and the high order 8 bits of the CCD 2, the count is set in the write address counter 63 of the CCD 1 and 08 H (08 in hexadecimal code) is set in the address counter 65 of the CCD 2, and a count-down mode is designated. Eight-bit shift registers for receiving the image signals from the respective CCD's are provided. The shift registers are driven for a period starting from the rise of the video enable signal which represents the main scan period of the CCD's and ended by a ripple carry of the counter (which is driven by the clock generated during the video enable period). Thus, the low order 8 bits of the image signal of the CCD 1 remain in the CCD 1 shift register and the high order 8 bits of the image signal of the CCD 2 remain in the CCD 2 shift register, after the first scan. The contents of the shift registers are read by the CPU 36 and stored in the RAM. Then, in order to extract the low order 9–16 bits of the CCD 1 and the high order 9–16 bits of the CCD 2, the count $-8$ is set in the write address counter 63 for the CCD 1 and 10H is set in the address counter 65 for the CCD 2. The above operations are repeated for each of sixteen scans to develop the high order 128 bits of the CCD 1 and the low order 128 bits of the CCD 2 in the memories. Then, the number of black bits, the number of low order white bits of the CCD 1 and the number of high order white bits of the CCD 2 are counted. The number of bits equal to a sum (the number of junction bits) of the low order white bits of the CCD 1, the number of high order white bits of the CCD 2 and the number of black bits of the CCD 2 is eliminated when the image data is read from the CCD 2 shift memory. In this manner, the jointing in the main scan direction is attained. (See FIGS. 12(a) and 12(b)).

The operation of the shift memories after the jointing operation is now explained. When the image data are to be written in the shift memories, the count is preset to the CCD 1 and CCD 2 write address counter 63 and the shift memories are addressed by counting down the address counter. This is shown in FIG. 12(c).

Figure 21:
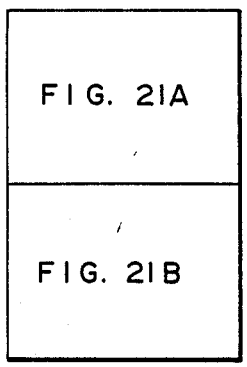
Figure 18A:
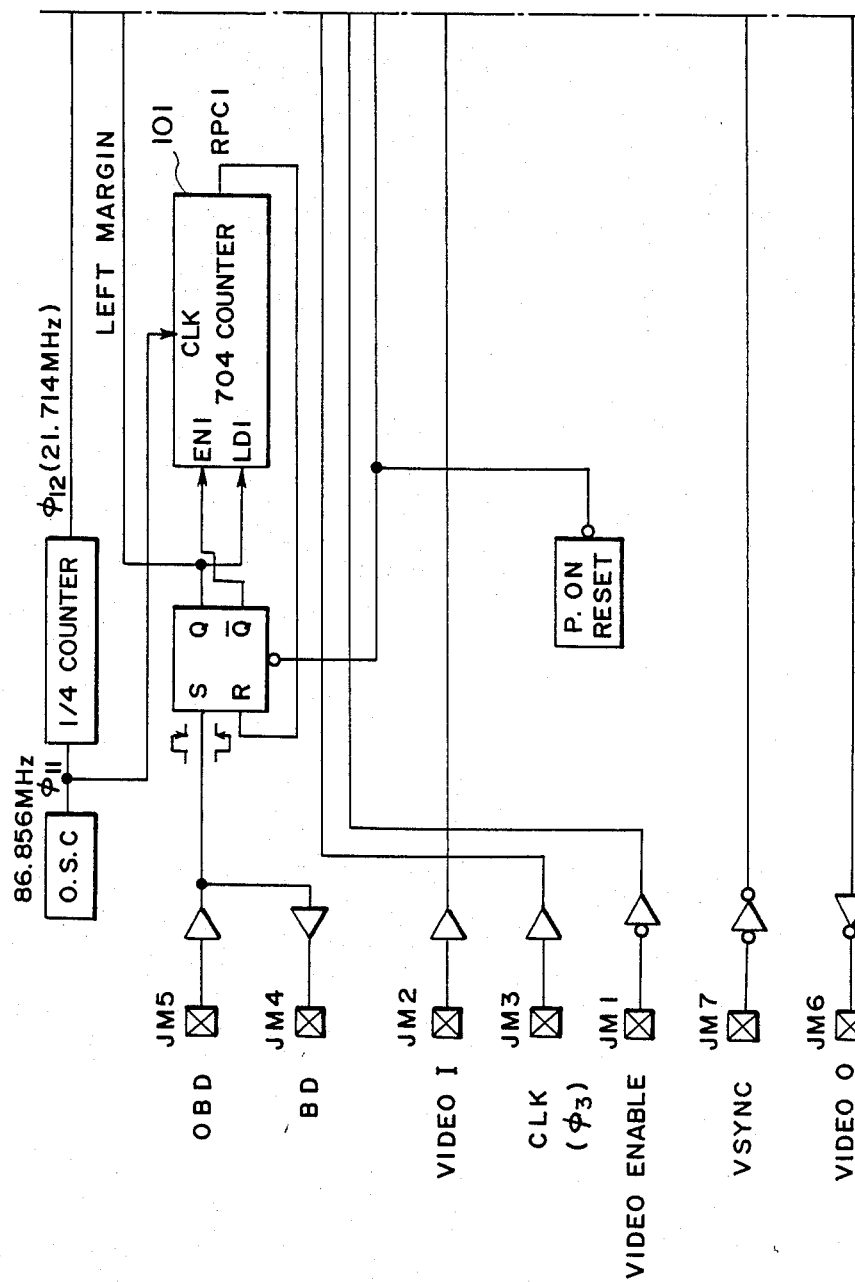
Figure 18B:
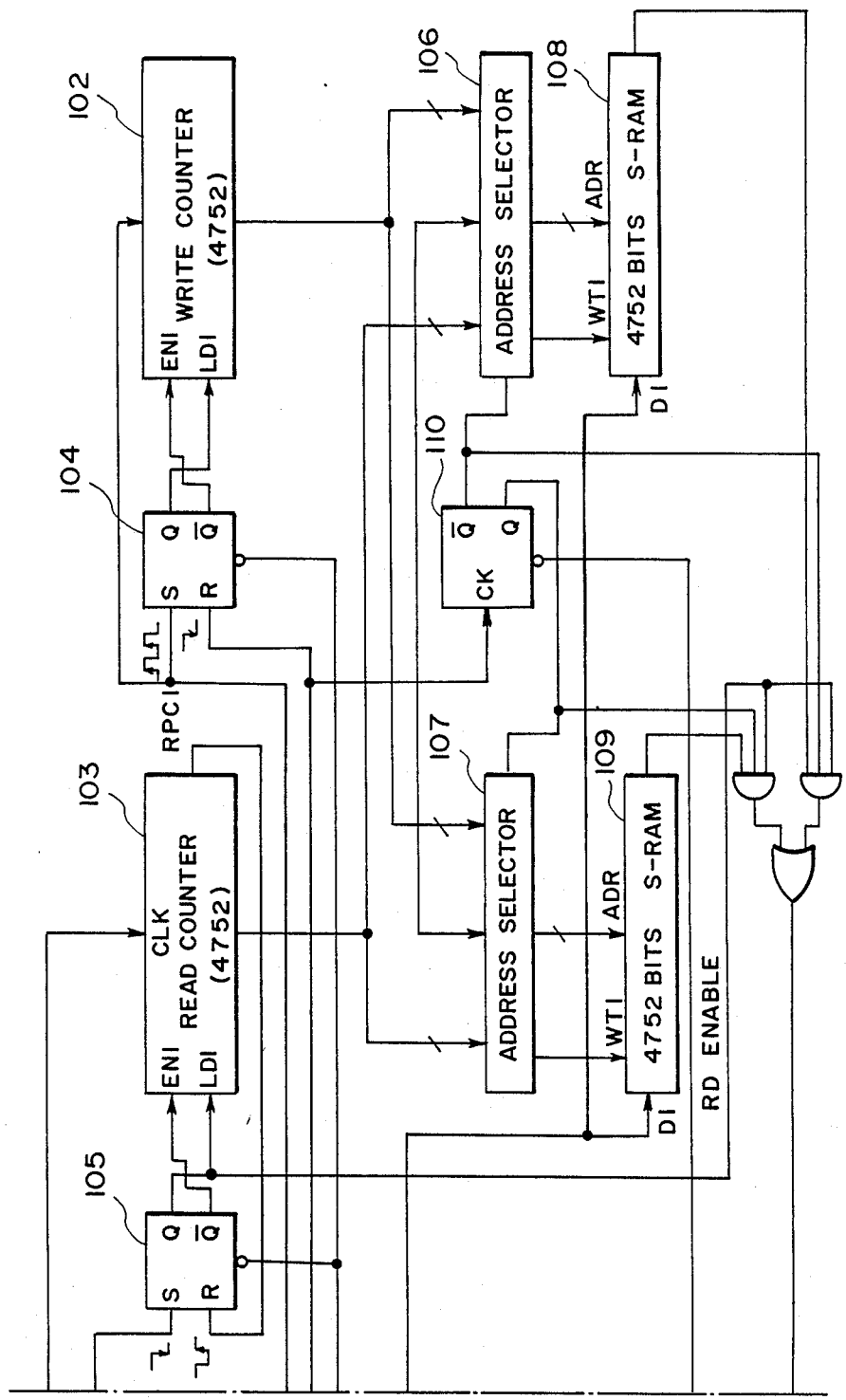

What is to be first considered when the image data is read from the shift memories is a reference of the main scan direction for the original as shown in FIG. 11, the reference point SP to mount the original is 148.5 mm off the center of the jointing black narrow line (of 1.5 mm width). Thus, a start address $A_1$ to read the CCD 1 shift memory is given by {(the number of low order white bits) + (the number of block bits)/2 + 148.5 × 16} × magnification scale. A start address to read the CCD 2 shift memory is given by {(the final count) − (the number of junction bits)} × magnification scale. The CCD 1 read address counter (1) is counted down by the read clock $\phi_3$ of 4752 pulses at 13.89 MHz, and when the count reaches zero and a ripple carry is produced, the CCD 2 address counter (2) is counted down to read out the image data from the shift memory. This is shown in FIG. 12(d). In this manner, one line of continuous image signal (video signal) is transmitted to the printer. As shown in FIG. 21, the writing to the memory and the reading from the memory can be continuously done by writing next line of signal to memories 57-3 and 57-4 while the signal is read from the memories 57-1 and 57-2, and writing further next line of signal to the memories 57-1 and 57-2 while the signal is read from the memories 57-3 and 57-4.

FIG. 13 shows a circuit relating to the shift memories. The shift memory (1) is a static memory which stores the CCD 1 image data. The shift memory (2) is a static memory which stores the CCD 2 image data. The write address counter 63 is an address counter to write data into the shift memories (1) and (2). The read address counter (1) is an address counter to read data from the shift memory (1), and the address counter (2) is an address counter to read data from the shift memory (2). An address selector (1) functions to select one of the address signal of the write address counter 63 and the address signal of the read address counter (1) to address the shift memory (1). An address selector (2) functions to select one of the address signal of the write address counter 63 and the address signal of the address counter (2) to address the shift memory (2). A shift register 74 functions to take out the CCD 1 image data eight bits at a time starting from the LSB, and a shift register 76 functions to take out the CCD 2 image data eight bits at a time starting from the MSB. A F/F 73 is a flip-flop which is set by the rise of the video enable signal and reset by the ripple carry of the write address counter 63, and it is used to control the input period of the shift register 74. A F/F 75 is a flip-flop which is set by the rise of the video enable signal and reset by the ripple carry of the read address counter (2). It is used to control the input period of the shift register 76. An I/O port 72 conveys the count of the write address counter 63 after it has been counted up, to the CPU. I/O registers 66–69 supply preset counts from the CPU to the write address counter 63 and the read address counters 64 and 65, respectively. The CPU designates, through the I/O register 68 the count-up or count-down mode of the write address counter 63 and the address counter 65, and also designates the selection of the counts of the address selectors 70 and 71. The I/O register 68 selects either the write clock or the read clock for the address counter (2) and supplies the TEST signal for jointing to the CPU. In response to the TEST signal, the CPU drives the CCD's while it stops the optical system in order to supply one line of image data to the shift memories through the CCD driver 33.

With reference to the circuit diagram of FIG. 13, the operation of extracting the CCD 1 image data eight bits at a time starting from the LSB and extracting the CCD 2 image data eight bits at a time starting from the MSB to extract 128 bits to joint the images is now explained.

① The CPU sets the write address counter 63 to the count-up mode and sets "0" in the I/O register (1). ② A pulse is generated as the TEST signal for the I/O register (4) (corresponding to machine start) so that the CCD driver in FIG. 10 generates the video enable signal and the $\phi_2$ clock in accordance with the magnification scale and the data is supplied to the shift memory. ③ The CPU reads in the content of the write address counter 63 through the I/O port. ④ The write address counter 63 is set to the count-down mode and the address counter (2) is set to the count-down mode. The count stored in the step ③ is preset into the I/O register (1) and 7H is preset into the I/O register (3). ⑤ One TEST signal pulse is generated, and when the video enable signal terminates, the eight bits of the shift registers 74 and 76 are read into the memory. ⑥ (The count stored in the step ③ - 7H) is set into the I/O register (1) and 10H is set into the I/O register (2). 7 The step 5 is repeated. ⑧ (The count stored in the step ③ - 77H) set into the I/O register (1) and 7FH (128th) is set into the I/O register (2). The TEST signal is issued to read in the shift registers 74 and 76. The junction correction is described in detail in Japanese Patent Application 57-128073 filed by the applicant of the present invention.

Trimming, Shift and Magnification/Reduction.

Figure 15C:
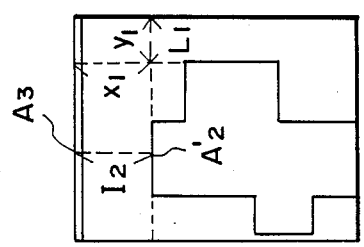
FIGS. 15A–15F and 15H–15L illustrate image conversion control.
Figure 15B:
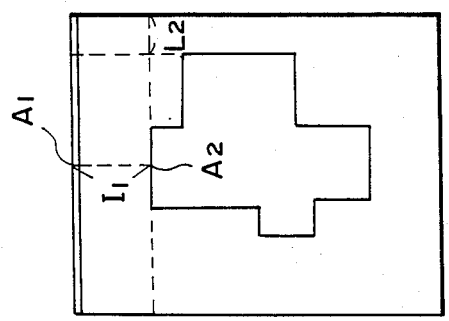
Figure 15A:
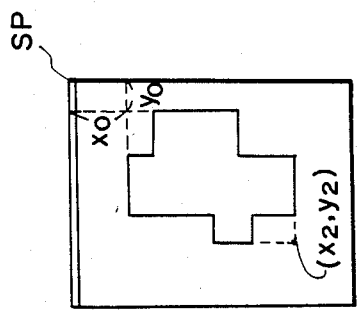
Figure 15F:
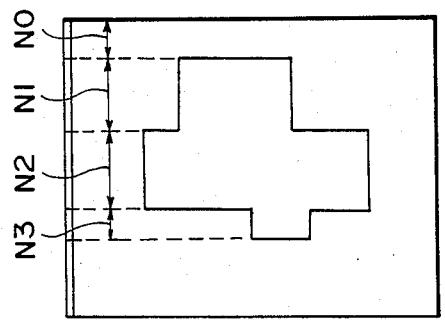
Figure 15E:
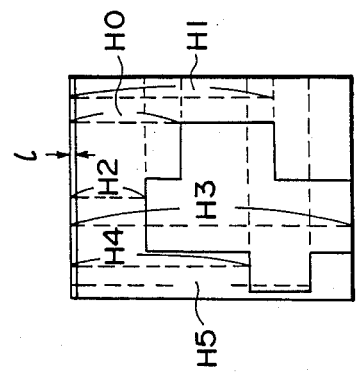
Figure 15D:
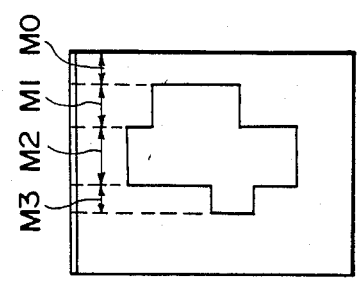

FIG. 15 illustrates image editing method for magnifying or reducing a trimmed image at a desired scale with reference to any point FIG. 15A shows an original, FIG. 15B shows an enlarged view and FIG. 15C shows a shifted view. A basic technique to edit the image is to calculate coordinates after the edition based on coordinates of a trimming area, moving coordinates and a magnification scale (FIGS. 15A–15C).

The steps are explained below. The CPU determines minimum coordinates $X_0$, $Y_0$ (relative to the reference point SP to mount the original) of the trimming area coordinates, where X is a coordinate in the main scan direction and Y is coordinate in the sub-scan direction. The coordinates are entered by the ten-key at a unit of mm. Because of 16 lines/mm, the number of lines $L_0$ of the $y_0$ coordinate is $y_0 \times 16$. The information $I_0$ of the $x_0$ coordinate is $x_0 \times 16$ (FIG. 15A).

The CPU determines the minimum coordinates $x_1$, $y_1$ from the moving coordinates after the edition (FIG. 15C).

A preset count of a start address to read is determined based on $x_0$, the magnification scale and $x_1$. (Calculation of address A3 of FIG. 15C). This is explained in more detail with reference to FIG. 15I. $4752 \times 2$ bits are used in the shift memory for the magnification of scale of two. The amount of information $I_1$ of the memory for the simple magnification is $I_0 \times$ magnification scale $=$ ($x_0 \times$ magnification scale $\times 16$) bits. An address A2 of the shift memory for the magnification scale of the trimming $x_0$ coordinate is $(A_1-I_1)$. The address $A_1$ is the start address of the memory which is stored in the RAM in the CCD junction correction operation. The number of lines $L_2$ for the magnification scale of the $y_0$ coordinate is $L_0 \times$ magnification scale $= y_0 \times$ magnification scale $\times 16$. Next, a start address $A_2+I_2$ to read the shift memory is determined to shift the magnified image to $x_1$ and output the image from that point. $I_2$ is the amount of information for the shift coordinate $x_1$, which is equal to $x_1 \times 16$. The number of lines $L_1$ of the $y_1$ coordinate is $y_1 \times 16$.

A time interval from the generation of the print start signal (paper feed roller drive signal) to the start of the optical system is determined based on $y_0$, the magnification scale m and $y_1$ (Calculation of $L_3$). It corresponds to $L_1-L_2$. When the difference is equal to $+L_3$ (that is, when a larger space is required), the start signal is generated $L_3 \times$ main scan cycle (347.2 $\mu$s) earlier than the reference T. When the difference is equal to $-L_3$, the start signal is generated later. In this manner, the positioning of the print image in the sub-scan direction is attained. The print start signal for the first copy is generated by the start key 13a of FIG. 4 and the print start signal for the second and subsequent copies are generated by the switch 37c of FIG. 9. In this manner, the start timing of the optical system is controlled. This is attained by the CPU 36 which determines $L_3$ and sends the control signal to the sequence driver 37.

The positioning of the image in the sub-scan direction may be attained by setting a time between the switch 37b which produces the image data and VSINK which starts the registration roller, in accordance with $L_3$.

Figure 15G:
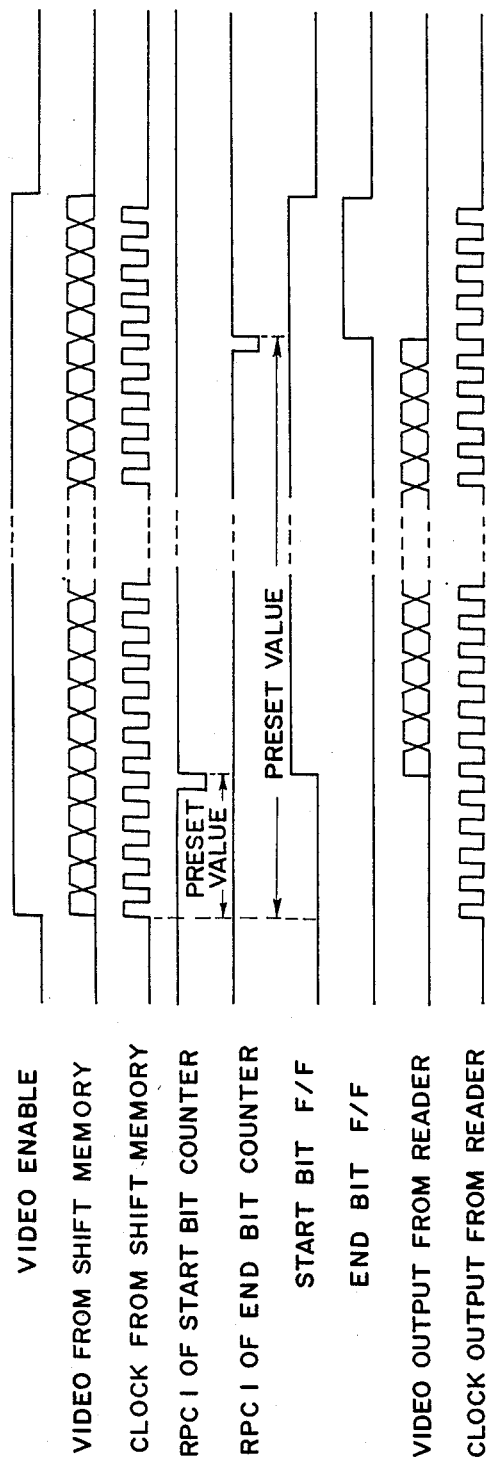
FIG. 15G shows a time chart for the operation of FIG. 13, FIGS. 16a, 16b and 16c show an example of image conversion, FIG. 17 composed of FIGS. 17A and 17B is a block diagram of a printer control, FIG. 18 composed of FIGS. 18A and 18B shows a circuit diagram in FIG. 17.

Only a portion of the image data in the main scan direction is gated to output the image to only the trimming area of FIG. 15C. To this end, a start bit counter and an end bit counter are provided. They correspond to the counters 80 and 81 of FIG. 13, respectively. Those counters preset the count data for gating, through the I/O for each trimming point. The flip-flop 82 is reset by the count-up of the counter 80 and reset by the counter 81. The operation is shown in FIG. 15G.

The number of bits in the main scan direction and the number of lines between transition points in the sub-scan direction are calculated based on the coordinates of the trimming area and the magnification scale (FIGS.

Figures 15H, 15I:
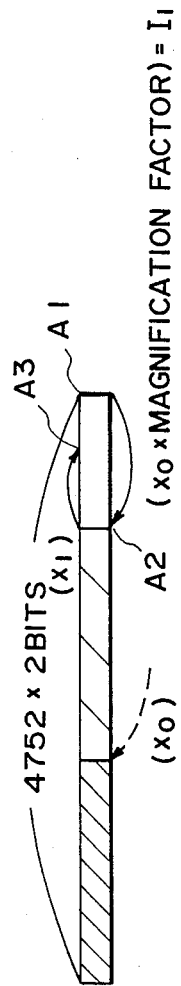

15D-15F). M represents the number of lines between the transition points in the sub-scan direction, H represents the number of bits in the main scan direction in the magnification and shift mode, and N represents the number of lines between the transition points in the sub-scan direction in the magnification mode (N=M×magnification scale). Those are stored in the RAM. H represents the X coordinate after edition and $H=m(h-x_0)+x_1$ where h is the trimming point and m is the magnification scale. The CPU calculates the data to be preset to the counters 80 and 81 and stores them in the RAM in a form of table as shown in FIG. 15H.

After the start of the readout of the image data from the shift memory, the CPU counts the video enable signal and presets 4751 bits to the counters until the count reaches $N_0$ and gates one line of data. Thus, the printer does not print out during this period. After the count $N_0$, the counters are preset to gate the data only during the period between $H_0$ bit and $H_1$ bit and the preset state is held until count $N_1$ have been reached. After the count $N_1$, $H_2$ bit and $H_3$ bit are preset. The above operations are repeated to complete the trimming.

Figure 15J:
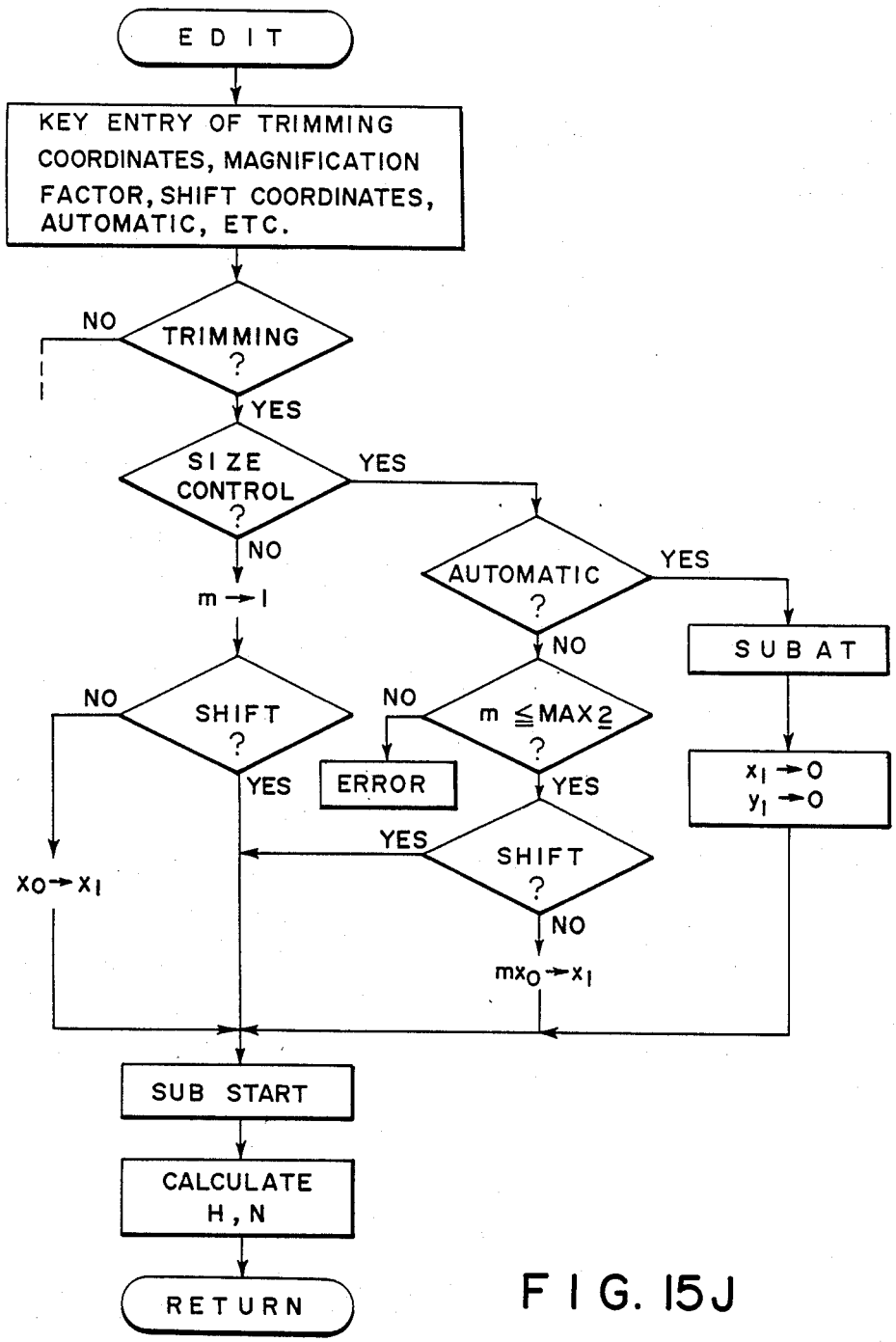
Figure 15K:
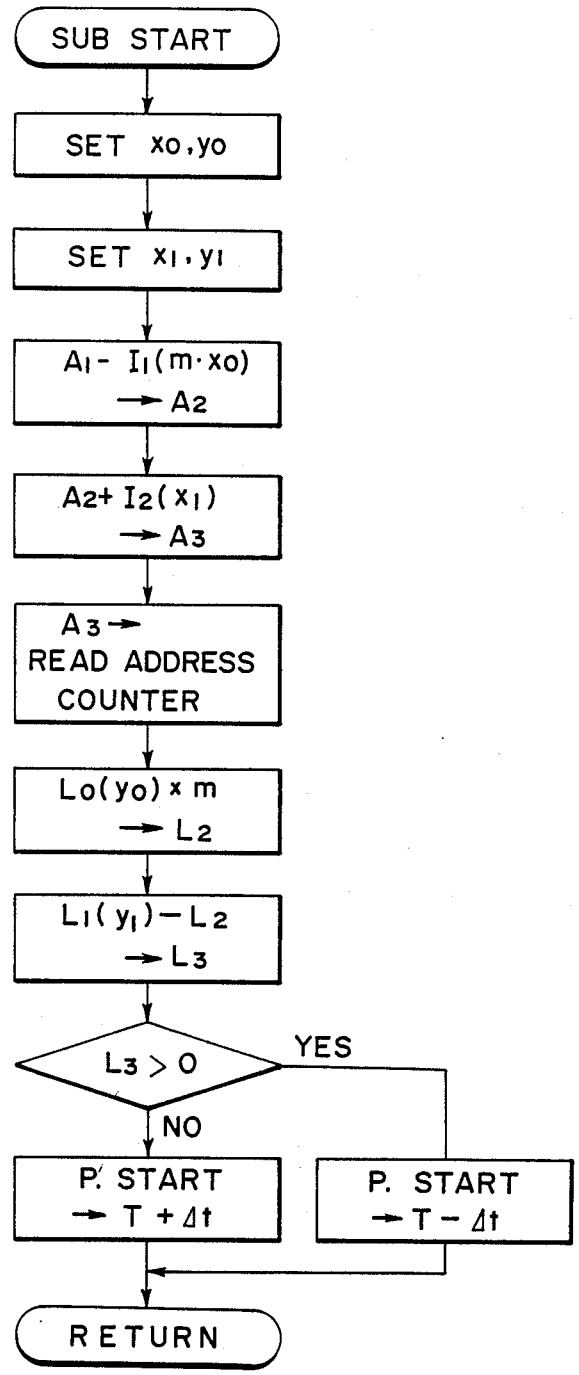

The above steps are shown in FIGS. 15J and 15K.

When the image is to be outputted on the entire area without trimming, the start bit counter 80 and the end bit counter 81 can be used to form a leading margin and a trailing margin. The initialization is same as that described above. After the count of 2 mm×16 lines=36 lines corresponding to the leading margin in the sub-scan direction, the start bit counter 80 is set to 7.5 mm×16 bits=120 bits to suppress the printout for the length 1 corresponding to the width of the separation belt.

FIG. 16 show examples of various image conversions. In FIG. 16(a), steps (6) and (7) are carried out by depressing the AUTO key. By depressing the ETC key 9a of FIG. 4, "AUTO KEY" is displayed on the display 10a. By depressing a soft key below the display, the steps (6) and (7) are carried out. To this end, the cassette size of the printer B is detected and the size data is sent to the reader A as the status data of FIG. 20-2 so that the CPU automatically selects the magnification scale suitable to the cassette size and controls the magnification operation with respect to the reference point SP. The vertical or horizontal orientation of the cassette sheet is selected by the magnification scale such that the entire trimmed image is printed out.

When the ETC key 9a of FIG. 4 is depressed, "REDUCTION" is displayed on the display 10a, and when a key below the display is depressed, (A3→A4, B4→B5, A4→A5) and (A3→B4, A4→B5, B4→A4) are alternately displayed. By depressing a key below a selected display, a fixed reduction scale is set. By depressing the ETC key again, "MAGNIFICATION" is displayed and (A4→A3, B5→B4, A5→A4) and (B4→A3, B5→A4, A4→B4) are displayed. By depressing a soft key below a selected display, a fixed magnification scale is set. By depressing the key 9a again, "Designate Magnification/Reduction Scale" is displayed on the display 10a. A magnification/reduction scale is designated by the ten-key. The magnification/reduction scale can assume 2 maximum and 0.5 minimum relative to the vertical and horizontal dimensions of the original. In the magnification/reduction scale designation with trimming, an error is displayed on the display 10a if the trimmed image size after the magnification exceeds the copy paper size.

Figure 15L:
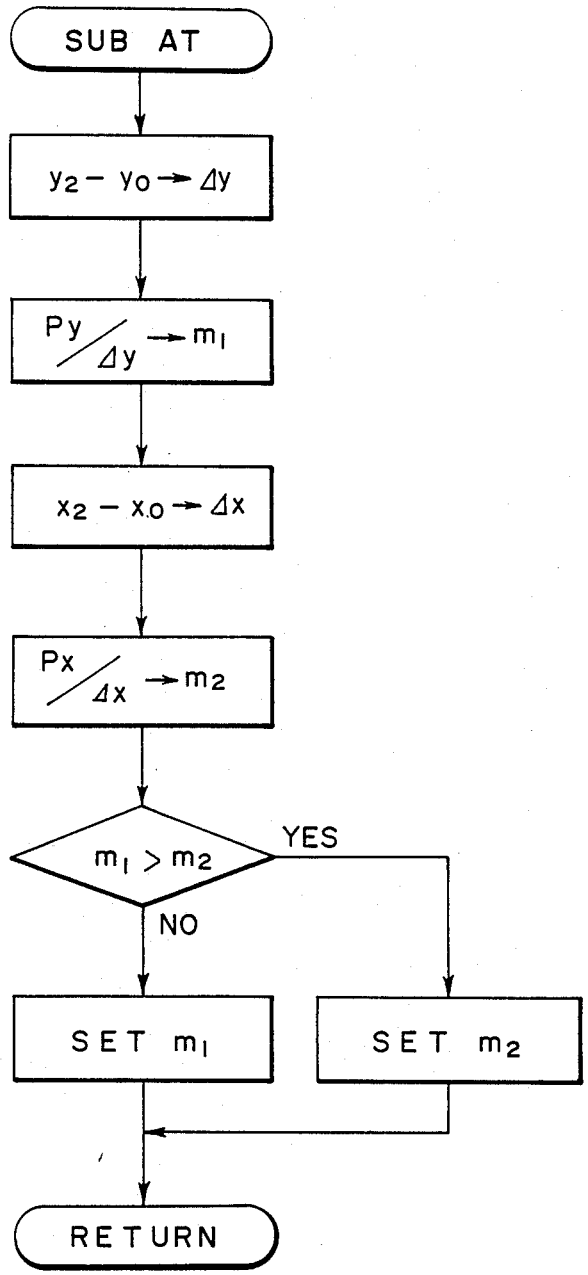

The procedure for the AUTO key is shown in FIG. 15L, in which $(x_0, Y_0)$ and $(x_2, Y_2)$ represent the trimming points of FIG. 15A. The trimming size is determined by $\Delta x$ and $\Delta y$, and (px, py) of the cassette size is compared with $(\Delta x, \Delta y)$ to determine the magnification scales $m_1$ and $m_2$, and smaller one of $m_1$ and $m_2$ is selected so that the entire trimmed image is printed out on the copy paper. Only the auto-corner shifting of the trimming area may be carried out by presetting m=1, $x_1\rightarrow 0$ and $y_1\rightarrow 0$ by the AUTO key in FIG. 15K.

In a step of FIG. 15J, an error alarm is issued if the magnified image of the designated manual magnification scale is beyond at least one of the cassette sizes Px and Py.

Even if the trimming is not commanded, the position of the original image on the copy paper can be shifted to a desired position or the original image can be magnified or reduced at any scale.

The above steps are carried out with the help of the control signals from the CPU of FIG. 6 and the data latches.

Figure 17:
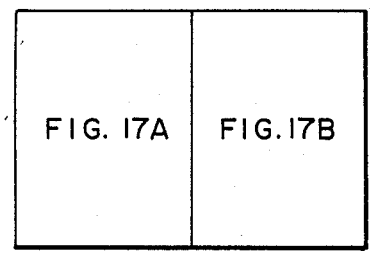

Printer Processor:

FIG. 17 shows a circuit block diagram of the printer unit B of FIG. 2. The heart of the control of the printer is a DC controller (1) and the CPU therein controls sequences such as feed timing of the copy paper, controls communication with the interface module 40a (FIG. 6) when the reader or printer is singly used to communicate with the external unit, controls the start of the laser scanner and detects the beam detect signal BD generated when the laser is activated. The connection with the reader A is done through connectors JP1-JP4. The connectors JP2 and JP3 receive the clock CLK of instant rate of 13.89 MBPS and 4752 bits/line generated by the reader, and the video data VIDEO. The connector JP4 receives the beam detect signal BD which is a laser beam position detect signal from the sensor 102 (FIG. 14.2) produced when the laser is activated when the scanner is rotated by the DC controller. The sensor 102 is arranged at 11 mm in front of the copy paper feed reference position (facing the transfer surface of the drum). Accordingly, by supplying the video data from the reader to the laser at a timing delayed from the signal BD by a scan period for 11 mm (left margin), the image synchronized with the copy paper can be produced.

Signals of the connector JP1 are now explained. VIDEO ENABLE represents valid periods of the video and clock signals. Those signals are active for a period during which 4752-bit signal is produced. VSYNC is a signal synchronized with the image leading edge sensor 37b of the reader. When the image shift is commanded, the timing of this signal is advanced or retarded relative to the center of the image leading edge sensor signal in accordance with the amount of shift. Thereafter, the signals VIDEO, CLK and VIDEO ENABLE are produced. The signal VSYNC is also supplied to the DC controller so that the DC controller rotates the registration roller in synchronism with VSYNC. In this manner, the synchronization between the leading edge of the copy paper and the image data is maintained. PRINT START is a paper feed command signal, PRINT END is a signal to indicate the end of writing of one page of data in the printer, and PRINT READY is a signal to indicate print ready (no jam, paper present, toner present) but it does not indicate whether the data can be immediately received. It is indicated by a PRINT ENABLE signal which is generated at the end of the pre-rotation of the drum for cleaning and also generated after the completion of the transfer. PRINTER CONNECT indicates that the printer is connected, and PRINTER POWER READY indicates that a power is supplied to the printer and the CPU in the printer has been initialized. READER POWER READY indicates that a power is supplied to the reader and the CPU in the reader has been initialized. S. DATA, S. CLK, CSC BUSY and PSC BUSY are protocol communication signals to the reader or the communication module B. After PRINTER CONNECT, PRINTER POWER READY and READER POWER READY have been issued, the communication by S. DATA, S. CLK, CSC BUSY and PSC BUSY is started. The synchronizing memory interface 2 functions to synchronize the VIDEO from the reader with the beam detect signal from the DC controller and output the VIDEO at a rate adapted to the rotating speed of the scanner and supply it to the laser driver through the DC controller.

Figure 18:
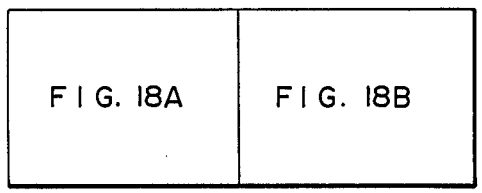
Figure 19:
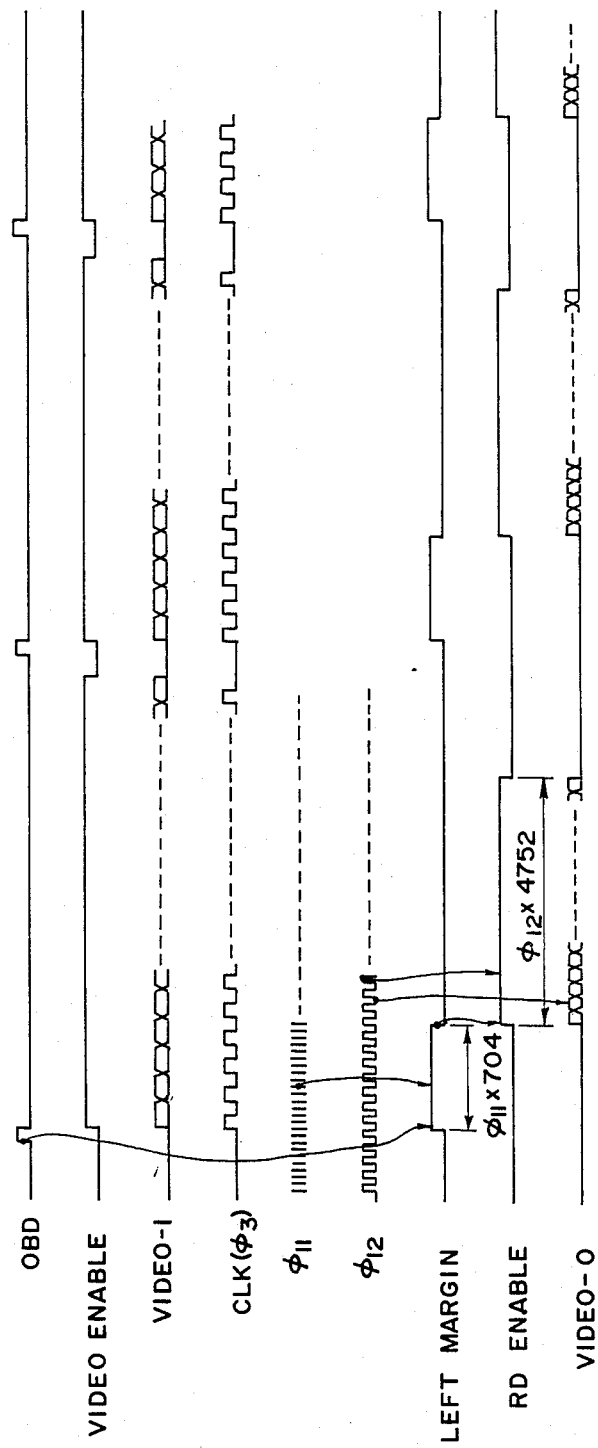
FIG. 19 shows a time chart for FIG. 18, FIG. 20A composed of FIGS. 20A-1 and 20A-2 illustrate command status, FIG. 20B composed of FIGS. 20B-1 and 20B-2 illustrate command status, and FIG. 21 composed of FIGS. 21A and 21B shows another circuit diagram.

An embodiment of the synchronizing memory is shown in FIG. 18 and a timing chart therefor is shown in FIG. 19. An effective scan period is approximately 63% of one period (347.2 $\mu$sec) of the laser beam. Accordingly, 4752 bits must be recorded in 347.2 $\mu$sec $\times$ 0.63 = 218.7 $\mu$sec. Thus, the frequency f to drive the laser is 4752/218.7 $\mu$sec = 21.72 MHz. Since the clock and BD are asynchronous, it is necessary to determine the leading edge of the image by a fixed time interval from BD. If the clock is counted to determine the time interval, a deviation of $\pm$1 bit in the worst case is included. Therefore, the clock is counted at a frequency equal to four times of the clock frequency. The quadruplicate frequency is an oscillation frequency of OSC. A 704-counter 101 in FIG. 18 determines a time interval corresponding to distance of 11 mm (left margin) and it counts 11 mm $\times$ 16 bits/mm $\times$ quadraplicate clock rate = 704. In order to supply the VIDEO signal sent from the reader at 13.89 MHz ($\phi_3$) to the laser driver at a frequency of 21.72 MHz ($\phi_{12}$), two static RAM's 108 and 109 are provided and the data is read from one RAM by the clock $\phi_{12}$ of 21.72 MHz in synchronism with BD while the VIDEO signal from the reader is written into the other RAM by CLK. A write counter 102 is driven by the clock $\phi_3$ of the reader and produces address signals of 4751−0. An F/F 104 determines the active period of the counter 102 and it is set for the VIDEO ENABLE period. A read counter 103 is driven by the internal clock $\phi_{12}$ (21.72 MHz) and produces address signals of 4751−0. An F/F 105 determines the active period of the counter 103 and it is set for a period from the count-up of the 704-counter to the end of the 4752 count by the counter 103. Address selectors 106 and 107 select address signals of the address counters 102 and 103 and supply the address signals to the static RAM's 108 and 109. An F/F 110 is triggered by VIDEO ENABLE and controls the address selectors such that when the address selector 106 selects the read counter 103, the address selector 107 selects the write counter 102. Thus, even if the read rate of the reader and the print rate of the printer are not equal or a transmission rate of the line is different from the rate of the reader or printer, the printing is carried out in real time. When the line of the specific rate is not used, the read rate of the memories 57-1 and 57-2 of FIG. 13 is set to the rate of $\phi_{12}$ so that the memories 108 and 109 may be omitted.

A protocol which uses lines of PSC, BUSY, CSC BUSY, SC. DATA and SC. CLOCK between the reader and the printer is now explained. The serial data sent from the reader is called a command, and the serial data sent from the printer to the reader is called a status. The status is always sent in response to the command. The status is never sent alone. FIGS. 20-1 and 20-2 show details of the command and the status. O–F of the command denote bits of a buffer for storing a command data and O–F of the status denote bits of a buffer for storing a status data. The data in the buffers are serially transferred between the reader and the printer through the S. DATA line and stored. The reader and the printer carry out various controls by checking the bits of the transferred data. When the printer detects an error in the received command, it always sends the whole status 2-1 back to the reader. Thus, when the whole status is sent back to the reader, the reader checks if the command is normal. If a hardware error (jam etc.) occurs in the printer, PRINT READY is changed to NOT READY. In order to check the detail of the error, the reader requests the whole status to the printed by a main unit command. When a further detail is to be checked, commands for the respective errors are issued from the reader to the printer so that individual status of the main unit can be checked. In response thereto, the reader displays jam and etc. A command (paper feed unit command) relating to the designation of the execution of operation such as cassette designation is settled when the print start signal is produced. At this time, the paper feed unit status 2-3 is sent back and the cassette size data is sent to the printer. Accordingly, before the print start signal is produced, the cassette designation may be altered. When the printer receives the print start signal, PRINT ENABLE is changed to NOT ENABLE. Since a command issued between a period from PRINT START to the change of PRINT ENABLE to NOT ENABLE may be indefinite, an execution command is inhibited during this-period. The command can be issued when PRINT ENABLE is either ENABLE or NOT ENABLE. However, the execution command issued during NOT ENABLE is held until it is changed to ENABLE and the command is not settled until PRINT START signal is produced. If PRINT START signal is produced during NOT ENABLE, it is neglected. If PRINT START is kept issued, it is accepted when NOT ENABLE is changed to PRINT ENABLE. If a noise is introduced during the serial transfer, a buffer full signal (bit F of the command buffer or the status buffer is "1") may not be issued. Thus, if CS BUSY changes to NOT BUSY, the printer checks if the buffer full signal is present, and if it is not present, the printer regards an error in the command code and sends back the whole status to the reader. The reader the retransmits the command. The transmission of the command and the status is not started until the CPU of the printer has been initialized. The reader counts PRINT START to count copies. When a predetermined count is reached, the reader issues the reader unit command 1-4 and sends a printer drum stop data DRUM START: 0. The printer responds to the data to stop the drum after a predetermined delay for paper discharge and post-cleaning. In response to PRINT START during PRINT READY, the command 1-4 is sent to the printer at the data DRUM START: 1. Thus, the printer start to rotate the drum. In response to PRINT START during PRINT ENABLE, the same command is sent to continue the rotation of the drum.

Thirty minutes after the copy count-up, the reader turns off the main power of the reader and sends the command 1-4 to the printer with the data SHUT OFF being set to "1" so that the main power of the printer is shut off. The whole status 2-1 is sent back from the printer. If the printer is not in the shut-off state, the command is retransmitted. The command 1-3 allows to designate the operation mode of the sorter and the storage bin from the reader when the sorter is added to the printer. Accordingly, the bins can be preset such that mails from a specified branch office are stored in a specified bin. The status 2-4 from the printer inform to the printer the data whether the shorter is connected, whether an empty bin is present and whether jam status is present.

What is claimed is:

1. An image forming system comprising:
   means for producing an image signal by scanning an original image in a main scan direction;
   means for moving a scanning position of said producing means along a sub-scan direction;
   memory means for storing said image signal;
   means for feeding a material on which an image is reproduced;
   means for reproducing an image on the material fed by said feeding means in accordance with the image signal from said memory means; and
   means for controlling an access address of said memory means so as to shift an image reproduction position on the material along the main scan direction and for controlling the relative operation between the moving of the scanning position and the feeding of the material so as to shift the image reproduction position on the material along the sub-scan direction.

2. An image forming system according to claim 1, wherein said producing means includes a sensor array.

3. An image forming system according to claim 1, wherein said memory means stores at least one line of the image signal.

4. An image forming system according to claim 1, wherein said reproducing means reproduces an image line by line.

5. An image forming system according to claim 1, further comprising means for setting a reproduction position of the image on the material.

6. An image forming system according to claim 5, wherein said controlling means is operable in accordance with the reproduction position set by setting means.

7. An image forming system according to claim 5, wherein said reproducing means reproduces a desired part of the image.

8. An image forming system comprising:
   means for producing an image signal by scanning an original image in a main scan direction;
   means for moving a scanning position of said producing means along a sub-scan direction;
   means for feeding a material on which an image is reproduced;
   means for reproducing an image on the material fed by said feeding means, in accordance with the image signal;
   means for inputting data representing a shift position for determining a reproduction position of the image on the material and a magnification or reduction scale for magnifying or reducing the image; and
   means for controlling the image reproduction in accordance with the shift position and the magnification or reduction scale so as to reproduce a magnified or reduced image at a desired position on the material, said controlling means controlling the relative operation between the moving of the scanning position and the feeding of the material so as to shift the reproduction position of the image along the sub-scan direction.

9. An image forming system according to claim 8, wherein said producing means includes a sensor array.

10. An image forming system according to claim 8, wherein said reproducing means reproduces an image line by line.

11. An image forming system according to claim 8, wherein said reproducing means reproduces a desired part of the image.

12. An image forming system according to claim 8, further comprising means for processing the image signal in accordance with the shift position and the magnification or reduction scale.

13. An image forming system comprising:
   means for producing an image signal representing an original image;
   means for reproducing an image on a material in accordance with the image signal;
   means for inputting a size signal concerning the material;
   means for inputting a coordinate signal indicating a desired area of the original image;
   means for determining a magnification or reduction scale in accordance with the coordinate signal and the size signal to reproduce a trimmed image magnified or reduced on the material; and
   means for processing the image signal in accordance with the magnification or reduction scale determined by said determining means.

14. An image forming system according to claim 13, wherein said producing means includes a sensor array.

15. An image forming system according to claim 13, wherein said reproducing means reproduces an image line by line.

16. An image forming system according to claim 13, further comprising means for extracting a signal from an image signal output from said reproducing means, said extracted signal representing an image of the desired area.

17. An image forming system comprising:
   means for producing an image signal by scanning an original image;
   means for reproducing an image on a material in accordance with the image signal;
   means for receiving a parameter representing either a shift position for determining a reproduction position of the image on the material or a magnification scale for magnifying the image;
   means for processing said image signal in accordance with said parameter so as to reproduce the image at a desired position on the material or to reproduce the magnified image on the material; and
   means for generating an error signal in the absence of the image being adequately reproduced on the material in accordance with the processed image signal.

18. An image forming system according to claim 17, wherein said producing means includes a sensor array.

19. An image forming system according to claim 17, wherein said reproducing means reproduces an image line by line.

20. An image forming system according to claim 7, further comprising means for setting the reproduction position or the magnification scale.

21. An image forming system according to claim 17, wherein said generating means generates an error signal when the image is not adequately reproduced within the material.

22. An image processing system comprising:
means for producing an analog image signal by scanning an original image;
means for converting the analog signal into a digital image signal;
means for processing the digital image signal in accordance with a magnification scale so as to magnify the original image; and
memory means for storing the digital image signal processed by said processing means,
said memory means having a capacity capable of storing a line of the digital image signal processed at the maximum magnification scale.

23. An image processing system according to claim 22, wherein said producing means includes a sensor array.

24. An image processing system according to claim 22, wherein said processing means increases the digital image signal in accordance with the magnification scale.

25. An image processing system according to claim 22, further comprising means for setting the magnification scale.

26. An image processing system according to claim 22, further comprising means for reproducing an image on a material in accordance with the digital image signal read out from said memory means.

27. An image processing system comprising:
a plurality of sensor arrays in parallel for scanning an original image; and
means for storing and processing image signals received from said sensor arrays to correct overlapped areas of said image signals;
said storing/processing means being controlled by a magnification/reduction scale.

28. An image processing system according to claim 27, further comprising means for detecting the overlapped areas.

29. An image processing system according to claim 27, further comprising means for setting the magnification/ reduction scale.

30. An image processing system according to claim 27, further comprising means for reproducing an image on a material in accordance with the image signals corrected by said storing/processing means.

31. An image processing system according to claim 27, wherein said storing/processing means removes image signals of the overlapped area.

32. An image forming system comprising:
reader means for reading an original image to produce an image signal;
printer means for receiving said image signal to reproduce an image on a material; and
means for starting a protocol of said reader means and said printer means after confirmation of initialization of said printer means and said printer means and sending said image signal from said reader means to said printer after the protocol;
wherein, by means of the protocol, a signal representing power-on of said reader means and the completion initialization of said reader means is sent to said printer means and a signal representing the power-on of said printer means and the completion of initialization of said printer means is sent to said reader means.

33. An image forming system according to claim 32, wherein said reader means includes a sensor array.

34. An image forming system according to claim 32, wherein said printer means reproduces an image line by line.

35. An image forming system according to claim 32, wherein said printer means reproduces the image during the reading of the original image by said reader means.

36. An image forming system comprising:
output means for producing a pixel image signal;
printer means for receiving said image signal and printing an image on a material; and
means for sending a command data signal, in addition to said image signal, from said output means to said printer means and sending a status data signal from said printer means to said output means in response to said command data signal;
wherein said printer means sends an abstract status to said output means and thereafter sends a detailed status to said output means.

37. An image forming system according to claim 36, wherein said output means includes means for scanning an original image to produce the pixel image signal representing the original image.

38. An image forming system according to claim 36, wherein said printer means reproduces an image line by line.

39. An image forming system according to claim 36, wherein said sending means sends data indicating an abnormal state of said printer means.

40. An image processing system comprising:
means for reading an original image to produce an image signal;
means for receiving the image signal; and
means for starting a protocol of said reading means and said receiving means after confirmation of initialization of said reading means and said receiving means, and sending the image signal from said reading means to said receiving means after the protocol;
wherein, by means of the protocol, a signal representing the power-on of said reading means and the completion of initialization of said reading means is sent to said receiving means and a signal representing the power-on of said receiving means and the completion of initialization of said receiving means is sent to said reading means.

41. An image processing system according to claim 40, wherein said reading means includes a sensor array.

42. An image processing system according to claim 40, wherein said receiving means comprises means for reproducing an image on a material in accordance with the image signal.

43. An image processing system comprising:
means for producing a pixel image signal;
means for receiving said image signal; and
means for sending a command data signal, in addition to said image signal, from said producing means to said receiving means and sending a status data signal from said receiving means to said producing means in response to said command data signal;
wherein an abstract status of said receiving means is sent to said producing means and thereafter a detailed status is sent to said producing means.

44. An image processing system according to claim 43, wherein said producing means includes a sensor array.

45. An image processing system according to claim 43, wherein said receiving means comprises means for reproducing an image on a material in accordance with the image signal.

46. An image processing system according to claim 43, wherein said sending means sends data indicating an abnormal state of said receiving means.

* * * * *

UNITED STATES PATENT AND TRADEMARK OFFICE
CERTIFICATE OF CORRECTION

PATENT NO. : 4,835,618

DATED : May 30, 1989

INVENTOR(S) : KATSUICHI SHIMIZU

It is certified that error appears in the above-identified patent and that said Letters Patent is hereby corrected as shown below:

SHEET 17 OF 44

Figure 10B:
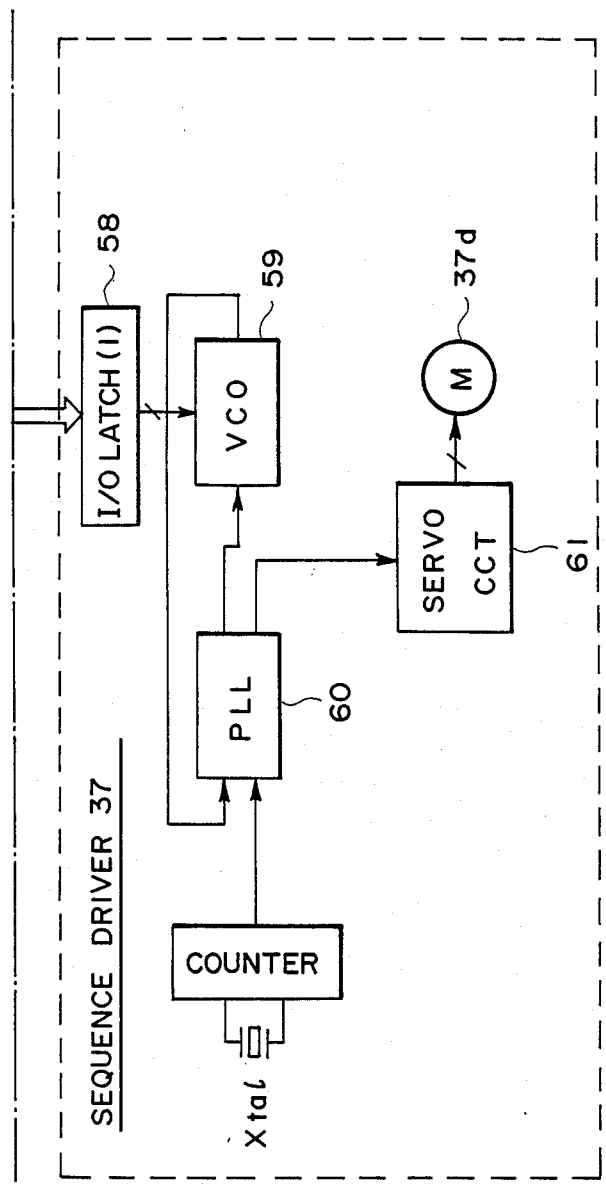
Figure 10C:
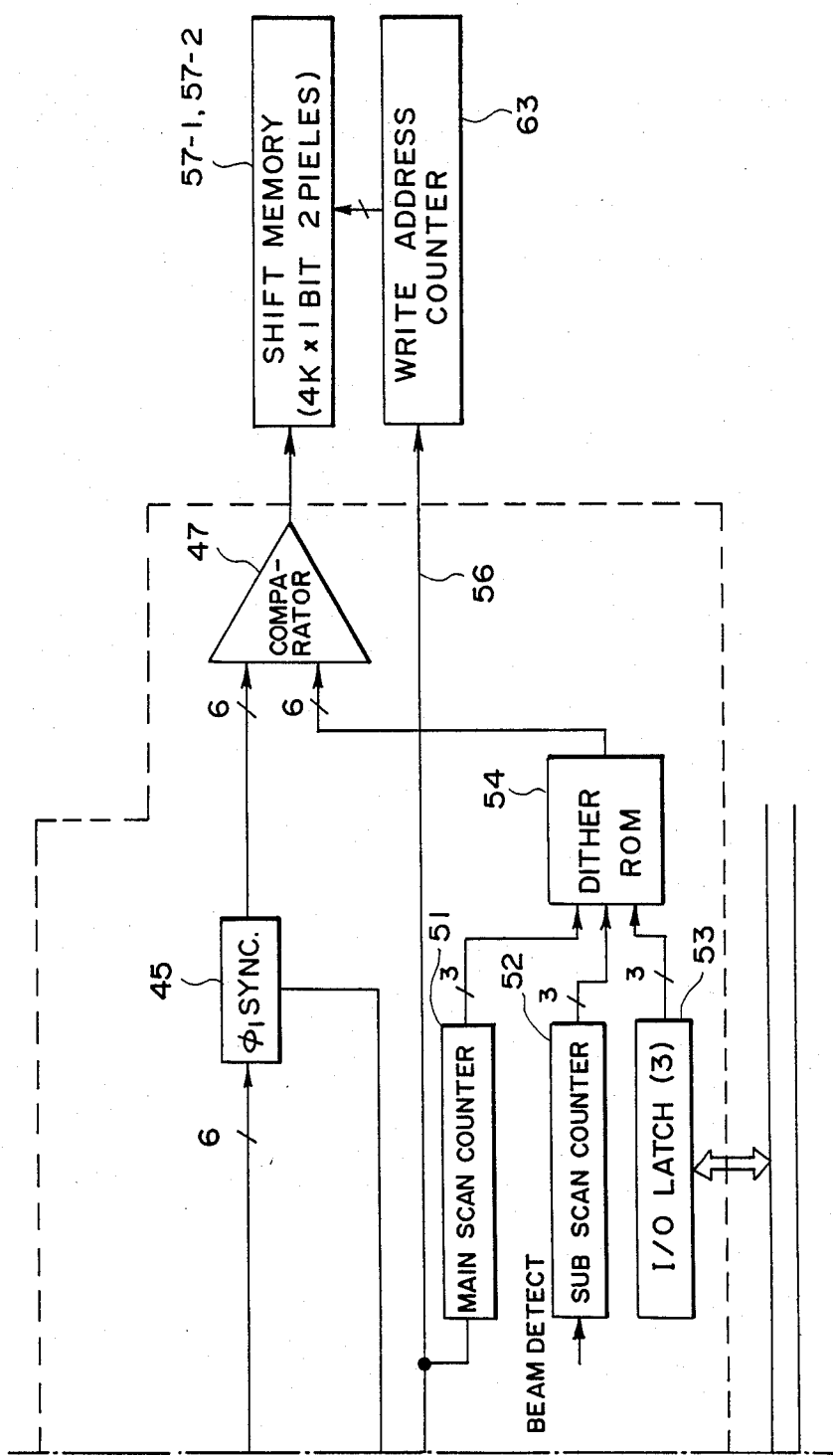

FIG. 10C, "2 PIELES)" should read --2 PIXELS)--.

SHEET 40 OF 44

FIG. 20A-2, "RANDON SORT" should read --RANDOM SORT--.

SHEET 41 OF 44

FIG. 20B-1, "WATING COMPLETION" should read --WAITING COMPLETION--.

COLUMN 2

Line 32, "netword" should read --network--.

COLUMN 3

Line 52, "collimeter" should read --collimator--.
    Line 56, "collimeter" should read --collimator--.

COLUMN 4

Line 6, "denote" should read --denotes--.
    Line 47, "triming" should read --trimming--.
    Line 56, "fuction." should read --function.--.

UNITED STATES PATENT AND TRADEMARK OFFICE
CERTIFICATE OF CORRECTION

PATENT NO. : 4,835,618
DATED : May 30, 1989
INVENTOR(S) : KATSUICHI SHIMIZU

Page 2 of 4

It is certified that error appears in the above-identified patent and that said Letters Patent is hereby corrected as shown below:

COLUMN 6

Line 8, "(quer-" should read --(que---.
    Line 43, "16" should read --1b--.
    Line 61, "digitize" should read --digitizes--.

COLUMN 7

Line 63, "psuedo" should read --pseudo--.
    Line 68, "psuedo" should read --pseudo--.

COLUMN 8

Line 3, "psuedo" should read --pseudo--.
    Line 9, "sensor 7b" should read --sensor 37b--.
    Line 12, "tking" should read --taking--.
    Line 13, "of" should be deleted.
    Line 16, "edges" should read --edge--.

COLUMN 9

Line 14, "produce" should read --produces--.

COLUMN 10

Line 33, "half tone" should read --half-tone--.

COLUMN 11

Line 26, "to variation" should read --the variation--.
    Line 32, "quantati-" should read --quanti--.
    Line 37, "low order 128 bit" should read
        --low order 128 bits--.

UNITED STATES PATENT AND TRADEMARK OFFICE
CERTIFICATE OF CORRECTION

PATENT NO. : 4,835,618
DATED : May 30, 1989
INVENTOR(S) : KATSUICHI SHIMIZU

It is certified that error appears in the above-identified patent and that said Letters Patent is hereby corrected as shown below:

COLUMN 12

Line 40, "block bits)" should read --black bits)--.

COLUMN 13

Line 54, "7 The step 5" should read --(7)The step (5)--.
Line 65, "point" should read --point.--.

COLUMN 14

Line 54, "VSINK" should read --VSYNC--.

COLUMN 15

Line 35, "show" should read --shows--.

COLUMN 16

Line 4, "(px,py)" should read --(Px,Py)--.
Line 22, "Processor:" should read --Processor--.
Line 38, "(FIG. 14.2)" should read --(FIG. 14B)--.

COLUMN 17

Line 37, "quadraplicate" should read --quadruplicate--.

COLUMN 18

Line 1, "PSC, BUSY," should read --PSC BUSY,--.
Line 39, "this-period." should read --this period.--.
Line 66, "start" should read --starts--.

UNITED STATES PATENT AND TRADEMARK OFFICE
CERTIFICATE OF CORRECTION

PATENT NO. : 4,835,618
DATED : May 30, 1989
INVENTOR(S) : KATSUICHI SHIMIZU

It is certified that error appears in the above-identified patent and that said Letters Patent is hereby corrected as shown below:

COLUMN 19

Line 12, "inform" should read --informs--.
Line 13, "shorter" should read --sorter--.

COLUMN 21

Line 4, "claim 7," should read --claim 17,--.
Line 66, "said printer means" (first occurrence) should read --said reader means--.

COLUMN 22

Line 3, "initialization" should read --of initialization--.

Signed and Sealed this

Eleventh Day of September, 1990

Attest:

HARRY F. MANBECK, JR.

*Attesting Officer*        *Commissioner of Patents and Trademarks*